US006475423B1

United States Patent
Masterson et al.

(10) Patent No.: US 6,475,423 B1
(45) Date of Patent: Nov. 5, 2002

(54) HYBRID INJECTION MOLDING PROCESS FOR ENHANCING EXTERIOR APPEARANCE OF MOLDED ARTICLES BY MOLDING FABRIC THERETO

(75) Inventors: Vincent Masterson, Barrington, IL (US); Mark Matecki, Hawthorn Woods, IL (US)

(73) Assignee: Slipmate Company, Elgin, IL (US)

( * ) Notice: Subject to any disclaimer, the term of this patent is extended or adjusted under 35 U.S.C. 154(b) by 0 days.

(21) Appl. No.: 09/502,807

(22) Filed: Feb. 11, 2000

Related U.S. Application Data

(63) Continuation-in-part of application No. 09/459,118, filed on Dec. 10, 1999.

(51) Int. Cl.[7] .......................... B29C 45/14; B29C 51/10
(52) U.S. Cl. .................. 264/511; 264/513; 264/547; 264/553; 264/255; 264/257; 264/267; 264/296; 425/127; 425/129.1; 425/387.1; 425/388
(58) Field of Search ................................ 264/511, 513, 264/547, 549, 553, 554, 255, 257, 267, 275, 296; 425/388, 387.1, 127, 129.1

(56) References Cited

U.S. PATENT DOCUMENTS

| | | |
|---|---|---|
| 2,694,227 A | 11/1954 | Fordyce |
| 3,336,424 A | 8/1967 | Cheney |
| 4,545,752 A | 10/1985 | Hanamoto et al. |
| 4,639,341 A | 1/1987 | Hanamoto et al. |
| 4,865,793 A | 9/1989 | Suzuki et al. |
| 4,994,224 A | 2/1991 | Itoh et al. |
| 5,074,770 A | 12/1991 | Graefe |
| 5,096,652 A | 3/1992 | Uchiyama et al. |
| 5,415,536 A | 5/1995 | Ohno |
| 5,676,981 A | 10/1997 | Miyazawa |
| 5,707,581 A | 1/1998 | Yamazaki |
| 5,843,555 A | 12/1998 | Atake et al. |
| 5,851,558 A | 12/1998 | Atake |
| 5,851,560 A | 12/1998 | Kobayashi et al. |
| 5,919,414 A | 7/1999 | Dobler |
| 5,925,302 A | 7/1999 | Oono |

FOREIGN PATENT DOCUMENTS

| | | | |
|---|---|---|---|
| JP | 57-29422 A | * | 2/1982 |
| JP | 60-48324 A | * | 3/1985 |
| JP | 6-115011 A | * | 4/1994 |

OTHER PUBLICATIONS

International Mold Steel, Inc., "Porcerax II," "Porous Composition Eliminates Forming Defects" (no date), pp. 33–46.

* cited by examiner

*Primary Examiner*—Jan H. Silbaugh
*Assistant Examiner*—Edmund H. Lee
(74) *Attorney, Agent, or Firm*—Vedder Price Kaufman & Kammholz

(57) ABSTRACT

A hybrid injection molding machine that has the capability to draw a decorative or fabric sheet into a mold cavity prior to injection into the mold has opposing male and female mold parts. At least one of the mold parts has an insert formed from a porous metal so that a vacuum may be drawn through the insert in order to draw the fabric sheet into all aspects of the insert cavity so that plastic may then be injection molded into the cavity of the mold.

12 Claims, 18 Drawing Sheets

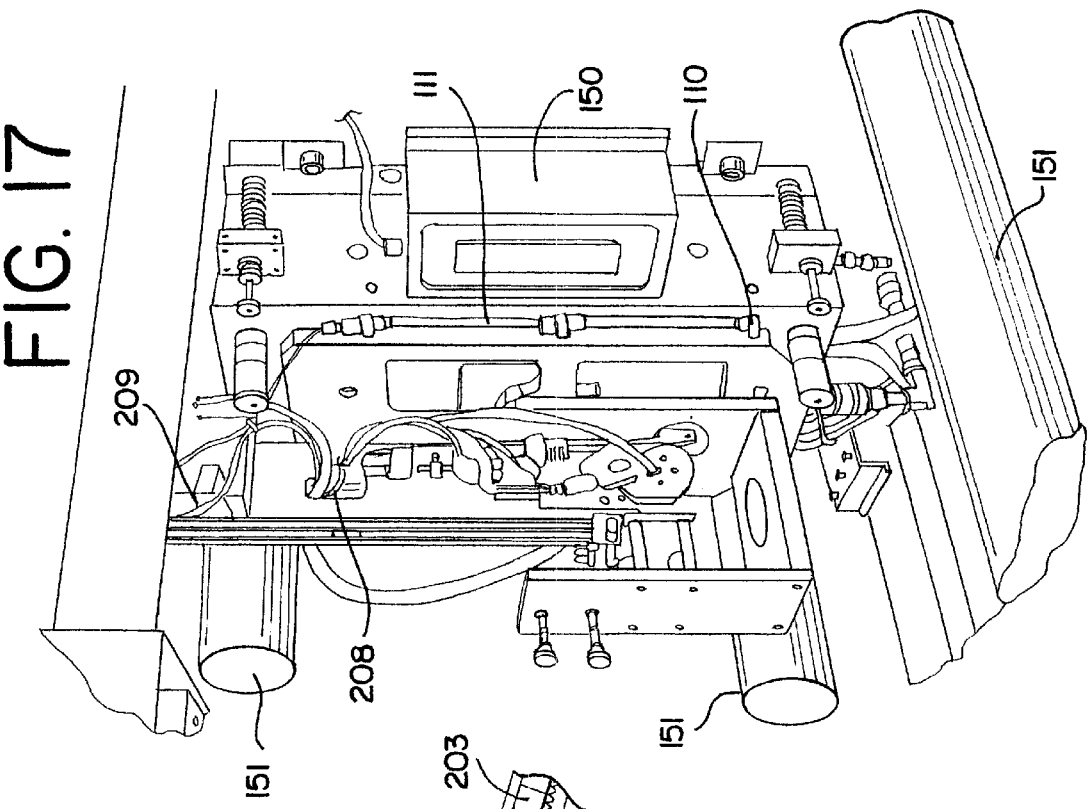
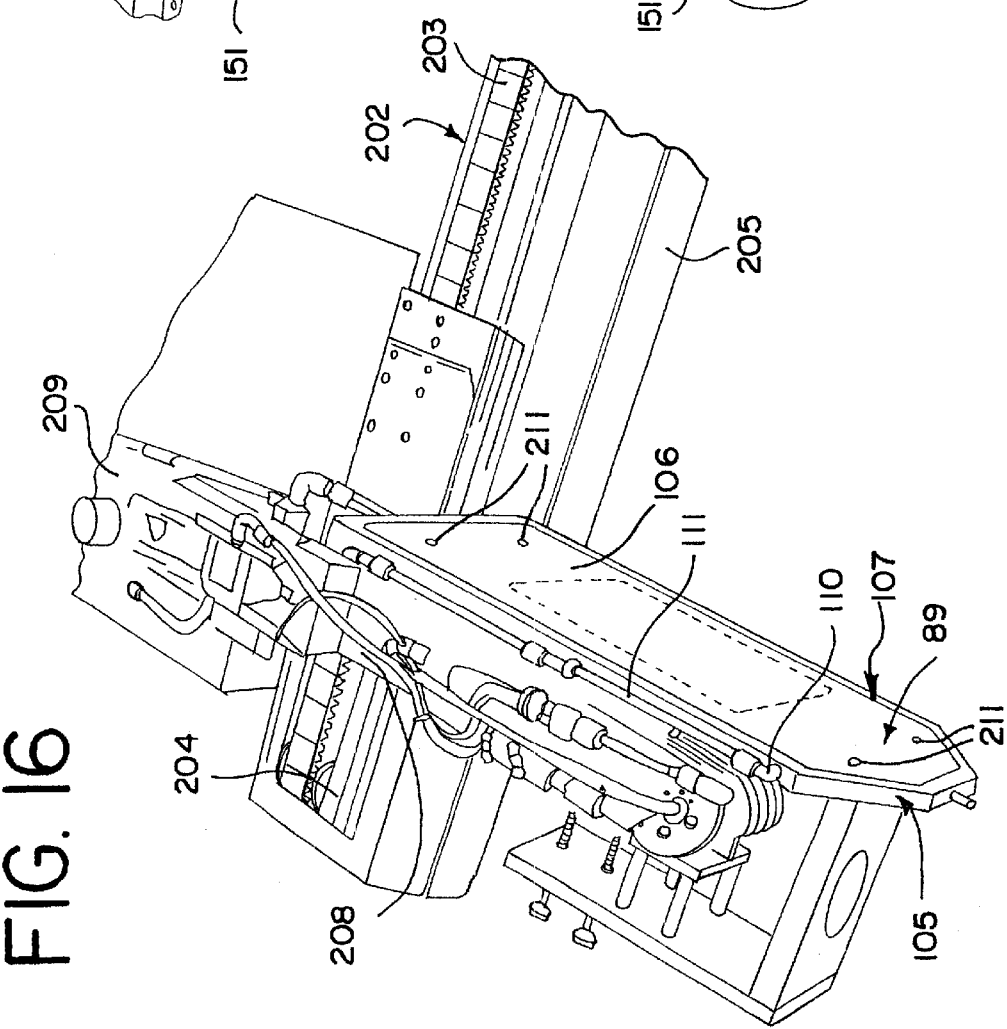

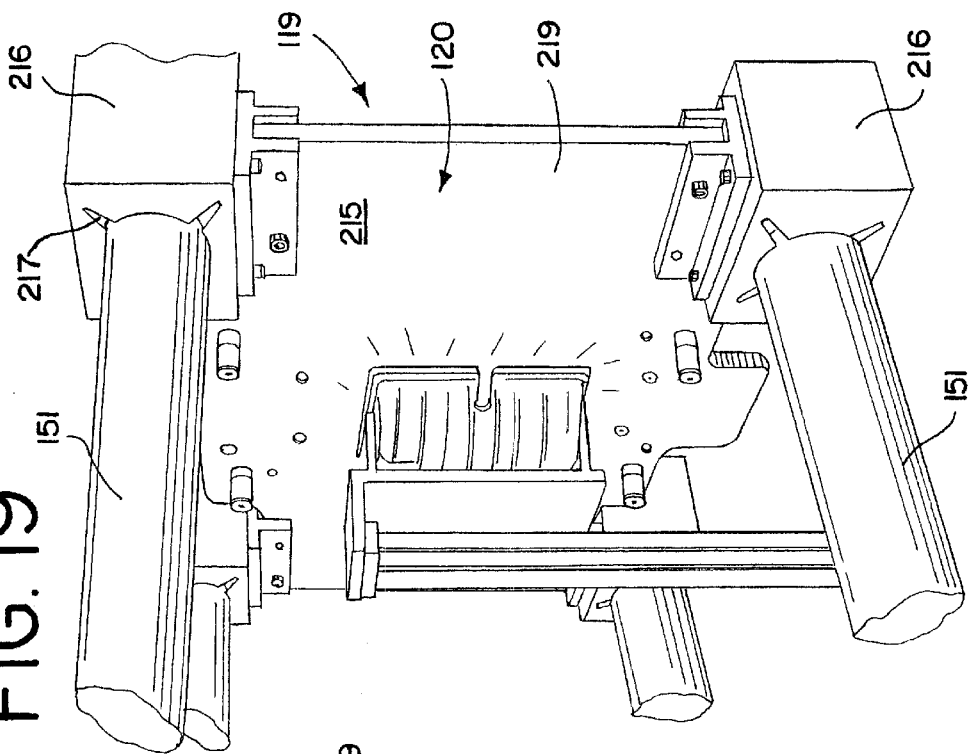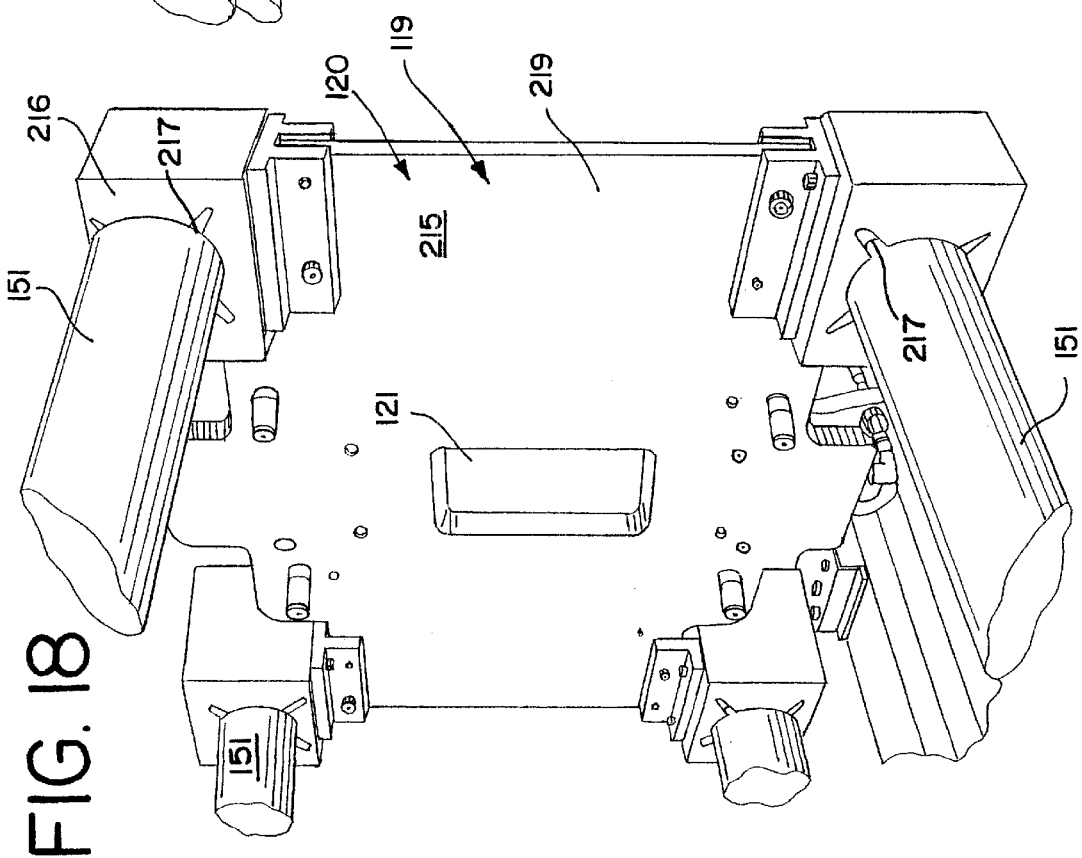

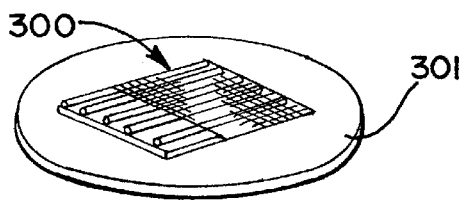
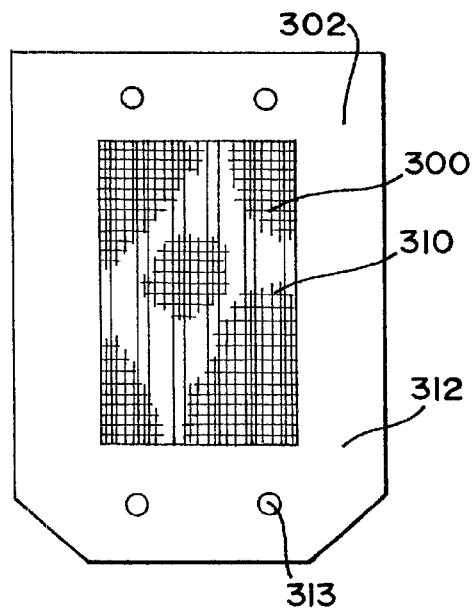
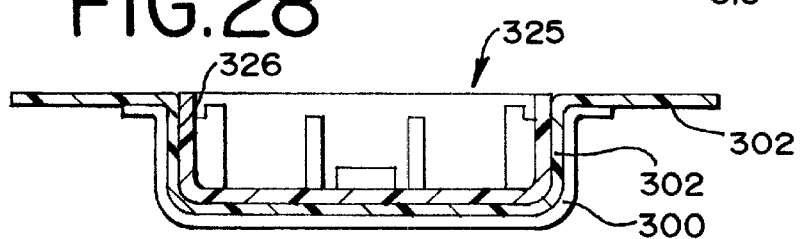
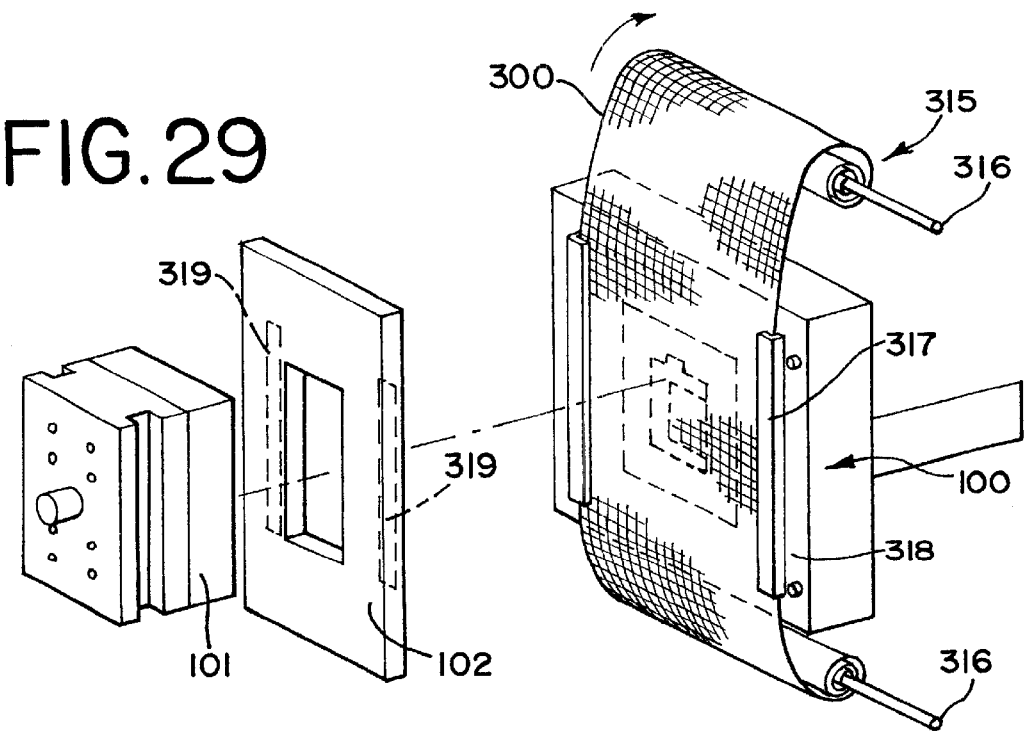

HYBRID INJECTION MOLDING PROCESS FOR ENHANCING EXTERIOR APPEARANCE OF MOLDED ARTICLES BY MOLDING FABRIC THERETO

REFERENCE TO RELATED APPLICATIONS

This is a continuation-in-part application of prior application Ser. No. 09/459,118, filed Dec, 10, 1999.

BACKGROUND OF THE INVENTION

The present invention relates generally to molding processes and articles molded thereby and, more particularly to an improved molding process in which decorative films are formed with the forming of the article to enhance the cosmetic appearance thereof.

Injection molding is used widely to produce numerous articles. These articles range from articles with simple configuration such as plates, light switches and the like to more complex molded shapes, such as wire less telephone housings. These molded articles often need to be decorated to enhance their visual appeal and their saleability. Some such articles may be decorated in the simplest sense of the term, by either adding pigments to the pellets of plastic used in the injection molding process or by using colored pellets to mold the article. Although these two methods are effective for coloring the molded article, they result in solid coloring of the article and are ineffective in forming any complex decorative appearance to the molded article.

Some other processes are known in the injection molding art for decorating molded products. One such process involves the use of stamping or otherwise applying a foil layer to the exterior of the molded product. In this process, the foil is applied to the molded article after the article is molded and ejected from the molding machine. This metal foil is thin and is prone to breakage on sharp corners and complex curves of the molded article. Registration problems are also encountered with this process.

Another process for decorating molded articles involves the use of "pad" printing in which colors or designs are applied to the molded article after molding, by way of one or some more printing pads. These pads are formed of foam rubber or other pliable material and have one or more inks deposited on their exterior surfaces, which are subsequently applied to the molded article. Problems exist in that the pad may not contact all the intended surfaces of the article and thus may not accurately apply the ink(s) to all surfaces, especially complex surfaces of the molded article. Similarly, the exterior surface of a molded article may serve to frustrate the use of screen printing the molded article. Hydrographics, the use of floating a decal in water and then applying it to the molded article, has its own limitations in that the decals are prone to tearing and there exist great difficulties in accurately registering the decals in place on a complex molded article.

In-mold decorating is yet another process that has been used to decorate injection molded articles. This process involves introducing a decorative film into the mold cavity. However, the film is delicate and fragile. It also has registration problems with complex molded articles inasmuch as the film inserted into the mold cavity is die cut. The walls and surfaces of the mold cavity are used for registration of the film in the mold cavity, and the mold cavity may not be modified to create any registration means. As such, this process is effectively limited to application to flat surfaces in the mold and on the final molded article, such as label recesses. It also cannot provide any details along the z-axis of the mold cavity or along the sides of the finished molded article.

A still further process involves the use of a decorative "preform", where an outer, decorative shell is formed complying to the configuration of the final molded article and it is inserted into the mold cavity prior to the injection of liquid plastic or other molding material into the mold cavity. The shape of this preform must conform accurately to the final configuration of the molded article. Where openings are molded into the article during the molding process, registration between the preform and the mold cavity must be critically maintained. Thin wall portions of the preform may result in leakage of the injected melt and problems with the finished article, leading to high rejection rates.

The process cannot accommodate the application of a fabric to a molded surface. A need therefore exists for an improved molding process for decorating the surfaces of a molded article that complements the usual operational parameters of the molding process and which overcomes the aforementioned disadvantages of the prior art. The present invention provides an improved injection molding process in which fabric may be applied to a molded article during the injection cycle of the molding process.

SUMMARY OF THE INVENTION

The present invention is therefore directed to a molding process in which a decorative film is applied to the exterior surface of a molded article.

Accordingly, it is a general object of the present invention to provide an improved molding process in which a decorative film is formed onto the exterior surface of a molded article during the actual molding thereof.

Another object of the present invention is to provide a hybrid injection molding process in which a decorative film is first prepared and subsequently intimately attached to a molded article by drawing the decorative film into a mold cavity, injecting a liquid melt into the mold cavity so that an intimate attachment results between the molded article and its associated decorative film.

Still another object of the present invention is to provide an improved molding process in which a film sheet is decorated with a preselected decorative pattern is applied in registration with a mold cavity, the film sheet is heated and drawn into the mold cavity by negative air pressure so that the film sheet is in contact with substantially all of the mold cavity interior surfaces, and a liquid melt, typically a liquid plastic, is injected into the mold cavity so that it entirely fills the mold cavity and contacts the film sheet so that when the liquid melt is cooled and the article is ejected from the mold cavity, the film sheet is intimately attached to the molded article.

Yet another object of the present invention is to provide a molding process for forming decorative molded articles that includes the following steps: modifying a mold cavity, preferably the core side, to include registration means for maintaining a decorative film sheet in registration with the mold core cavity; applying the decorative film sheet to the mold core cavity; softening the decorative film sheet; applying negative air pressure to at least a portion of the mold core cavity to drawn the decorative film into the mold core cavity and at least into partial contact with the surfaces of the mold core cavity; bringing an opposing mold detail member into engagement with the mold core to form a final mold cavity; and, injecting a liquid molding compound into the mold cavity under pressure to form a molded article, the decorative film sheet being bonded to the molded article along substantially all of the exterior surfaces of the molded article.

A still further object of the present invention is to provide a molding machine for performing a hybrid molding process in which a decorative film sheet is drawn into one of two coacting mold blocks in order to contact the interior surface of the one mold block, and a heated molding compound is injected under pressure into the mold cavity so that the decorative film sheet becomes bonded to the molded article, the molding machine having means for holding the film in place over one of the two mold blocks and in registration with the mold cavity of the one mold block, the machine further having means for drawing the decorative film sheet into the one mold block through the cavity of the one mold block and means for maintaining the film sheet in place during injection of molding material into the mold cavity.

A yet still further object of the present invention is to provide a unique molded article having a body portion and an exterior decorative portion, the two portions of the molded article being intimately attached to each other.

Yet a further object of the present invention is to provide a decorative sheet for insertion into a mold cavity and subsequent attachment thereof to a molded article during the molding of the article, the sheet having a decorative area defined thereon that includes a decorative pattern for attachment to the molded article, the decorative area being printed, painted or otherwise formed, the decorative area having a surface area that is generally no smaller than a corresponding surface area of the mold cavity, the decorative sheet including means for registering the sheet and the decorative area in alignment with the mold cavity, the decorative sheet registration means engaging a complementary registration means formed on one of the mold blocks of the molding machine, preferably the mold cavity or core block, and the decorative sheet further having a flat profile so that it can be easily interposed and held in place between the two molding blocks of the molding machine during the molding process.

Another object of the present invention is to provide an injection molding machine that is adapted for hybrid molding in which a film is inserted into the mold cavity, as part of the injection molding process, the molding machine having at least two opposing mold blocks, one of the two mold blocks including a mold core portion and the other of the two mold blocks including a mold detail portion, the molding machine further including a member that is selectively interposed between the two mold blocks to, in essence, "capture" a film sheet therebetween, the captive member and at least one of the two mold blocks having cooperating means for registering the film sheet with the one mold block, one of the two mold blocks including a porous insert that forms a portion of the mold cavity, the porosity of the insert enabling negative air pressure to be applied thereto so that a portion of the film sheet may be drawn into the mold cavity.

Still another object of the present invention is to provide an improved molding process in which a fabric or other textile material is applied to the exterior surface of the molded article and is intimately attached to the exterior surface of the molded article.

Another object of the present invention is to provide a process for injection molding a plastic article and bonding a fabric to a surface of the article during molding, the process including the steps of providing opposing mold core and cavity members, each of the core and cavity members having a porous portion through which gases may pass but not the injected molding material, positioning a fabric sheet over the cavity member, drawing a vacuum in the mold cavity by applying negative air pressure to the mold cavity porous position, applying positive air pressure to the mold core porous position and directing it to a second side of the fabric sheet to thereby assist the drawing of the fabric sheet into the mold cavity, and subsequently injecting a molding material into the mold cavity.

Still another object of the present invention is to provide an injection molding machine for molding parts with a fabric intimately applied to the part, the machine including a pair of opposing mold members, one of the members including a cavity portion and the other of the members including a core portion that extends into the cavity portion when the two members are brought together; each of the mold core and cavity members including at least one porous portion through which gases can pass but not the injected material; a means for applying negative air pressure communicating with the mold cavity member; a means for communicating positive air pressure with the mold core member and a means for positioning a fabric sheet along the parting line between the mold members.

These and other objects of the invention are enabled by the unique steps set out in the methods of the present invention and by the novel structure of certain aspects of the equipment used in methods of the invention.

As exemplified by one embodiment of the invention, a molding machine that has two mold coacting mold blocks, one mold block providing a mold core and the other mold block providing a mold core detail, is modified to accept a decorative film sheet in place over one of the mold blocks, preferably that providing the mold core. The mold core block has means for registering the decorative film sheet in a preselected position between the two mold blocks, such as a plurality of raised pins extending axially outwardly from the outer surface of the mold core block. These registration pins are disposed outside the perimeter of the mold core so that a placement mechanism may be used to apply the film sheet to the mold core block.

The placement mechanism preferably takes the form of a robotic placement arm that is movable in three different spatial axes, such as conventional x-axis, y-axis and z-axis so that proper placement of the decorative film sheet may be assured. The placement mechanism may include a film gripping means such as vacuum-driven cups that selectively contact predetermined portions of the film sheet and can release it on demand. The placement arm may have hollow portions associated therewith that serve to mate with the raised registration pins of the mold core block.

The molding machine also incorporates a retention mechanism that holds the film in place, and captures it in a position on the mold core block and between the mold core and detail blocks. This utilizes a novel retention plate that is held in place over the film sheet and over the mold core block by an electromagnetic system that is capable of selective energization, that when energized, clamps the film sheet in place across the parting line of the mold core block. This retention plate may utilize its electromagnetic attachment aspect to attach itself to either of the two mold blocks of the machine so that it may be initially attached to the mold core block and then attached to the mold core detail block when the two mold blocks are opened. A heat source that is selectively movable in and out of heating contact with the film sheet is also provided and is utilized to soften the film sheet so that is may be more easily drawn into the mold cavity. This heating contact occurs by means of an opening formed in the retention plate.

The mold core block preferably includes a mold core insert disposed therein that is formed from a porous metal insert. A vacuum is drawn on the mold core cavity by way of these pores when negative air pressure is applied to the mold core cavity, thereby negating the need for modifying either the mold core or the mold detail with vacuum passages that may weaken the overall strength of the mold core and its cavity. By using this porous insert, the vacuum is drawn evenly through the mold core cavity and the decorative film is uniformly drawn into the mold core cavity. Once the film is drawn into the mold core cavity, the mold detail is moved into the mold core cavity and a liquid molding material is injected into the resultant cavity. The injected molding material attaches itself to the film sheet that overlies the mold core cavity and assists in moving the film sheet to the outer reaches of the mold core cavity, to the extent that the vacuum drawing step has not accomplished this. The porosity of the entire, or selected porions of the mold core cavity, permits complex geometric shapes to be molded with an outer and sometimes decorative skin integrally attached to the final molded article.

After the decorative film is drawn into the mold cavity, the two mold blocks are brought together to close and seal the mold cavity. An injection nozzle is brought into contact with the mold blocks and, in the preferred embodiment of the invention, is brought in from the mold core side of the mold cavity. Its initial injection of molding material pieces through the film sheet drawn into the mold. Molten molding material then fills the cavity against the film sheet and becomes bonded to it. The injection pressure of the molding material also serves to force any remaining portions of the film sheet into contact with the mold core cavity.

In accordance with a second embodiment of the invention, when the liquid molding material is injected, and typically the injected material will be a heated and liquefied plastic, a homogenous one-piece plastic part is formed with an integral "skin" applied to the exterior surface thereof. The film sheet may be applied to either to exterior or to the interior surfaces of the final molded part by simply attaching the decorative film sheet to either the mold core or detail mold block. The film may have any one of a number of different designs disposed thereon and by different means such as screen printing, photolithography for example.

In another embodiment of the invention which is particularly suitable for use in molding an article with a fabric covering, coacting members are provided for the injection molding machine, one of the members has a cavity portion associated therewith with a configuration of one side of the article to be molded, while the other of the two members has a detail portion that projects therefrom into the cavity portion of the other member when the two members are brought together along a parting line.

A fabric sheet is interposed between the two members along the parting line and it may be positioned in registration with the cavity by way of a robotic arm, carrier plate or motorized drive assembly that its able to position the fabric accurately.

When the fabric sheet is interposed between the members and after the two members are brought together, negative air pressure is applied to the cavity portions, and it communicates with the cavity by way of one or more porous metal inserts. These porous metal inserts are porous to the extent that they permit the passage through them of gasses without either permitting the passage of molding material through them or reducing the standard integrity of the cavity portion. This vacuum will draw the fabric sheet down into the cavity.

In order to assist this drawing of the fabric sheet into the cavity, the detail portion also has one or more porous metal inserts associated therewith. A source of positive air pressure communicates with this insert and positive air pressure may be applied to the other side of the fabric sheet to assist in the drawing of the fabric sheet into the cavity. Molding material is then injected into the cavity on the other side of the fabric sheet while this material is being injected, the positive air pressure shuts down into a neutral mode so that it may serve as a vent for air evacuating from the cavity under the urging of the injected molding material.

These and other objects, features and advantages of the present invention will be clearly understood through consideration of the following detailed description.

BRIEF DESCRIPTION OF THE DRAWINGS

In the course of the following description of the detailed description, reference will be made to the attached drawings wherein like reference numerals identify like parts and wherein:

FIGS. 2–7 are schematic diagrams that cooperatively illustrate one molding cycle in accordance with the principles of the present invention, wherein FIG. 2 is an exploded schematic view illustrating the major components used in the molding processes of the present invention;

FIG. 3 is a schematic perspective view of the placement arm assembly placing a sheet of decorative film onto a mold cavity block;

FIG. 4 is a schematic perspective view illustrating the step of removing the robotic placement arm after the decorative film has been placed in registration with the mold cavity block;

FIG. 5 is a schematic view illustrating the step of locking the decorative film into place on the mold cavity block and bringing a heating means in proximity to it to heat the plastic sheet;

FIG. 6 is a schematic view illustrating the step of bringing the mold core block toward the mold cavity block to hold the locking plate and decorative film in place within the overall mold head so that injection may take place;

FIG. 7 is a schematic view illustrating the step of separating the mold cavity and core blocks apart after plastic or other molding material has been injected into the resultant mold cavity so that the molded part and decorative film assembly may be removed from the mold;

FIG. 16 is a perspective view of the robotic placement arm of FIG. 15 but taken from a different angle and illustrating the decorative film in place on the placement arm;

FIG. 17 is a perspective view of the injection molding machine of FIG. 14 illustrating the placement arm in registration with the mold cavity block and placing the decorative film in place thereon;

FIG. 18 is the same view as FIG. 17, but illustrating the placement arm withdrawn and a film retention plate thereover holding the film in place;

FIG. 19 is the same view as FIG. 18, but illustrating a heat source brought into proximity with the opening on the locking plate in opposition to the decorative film and the mold cavity.

FIG. 26 is a perspective view of a fabric segment showing the fabric with a sealing backing layer;

FIG. 27 is a top plan view of a fabric sheet in place upon a film carrier member to from a fabric carrier assembly;

FIG. 28 is a sectional view of a molded article with a fabric sheet bonded thereto by the process of the embodiment of FIG. 25, and using a fabric carrier assembly of FIG. 27;

FIG. 29 is a schematic view of a molding apparatus illustrating one means of feeding the fabric to the cavity member and holding it registration with the cavity;

DETAILED DESCRIPTION OF THE PREFERRED EMBODIMENTS

The present invention is directed to a unique hybrid molding process in which a decorative sheet is drawn into a mold cavity into contact with a surface thereof so that a molding material subsequently injected into the mold cavity joins to the sheet. This process is referred to as "hybrid" herein because it involves two different media: a material sheet and an injectable molding material.

The Molded Article

Figure 9:
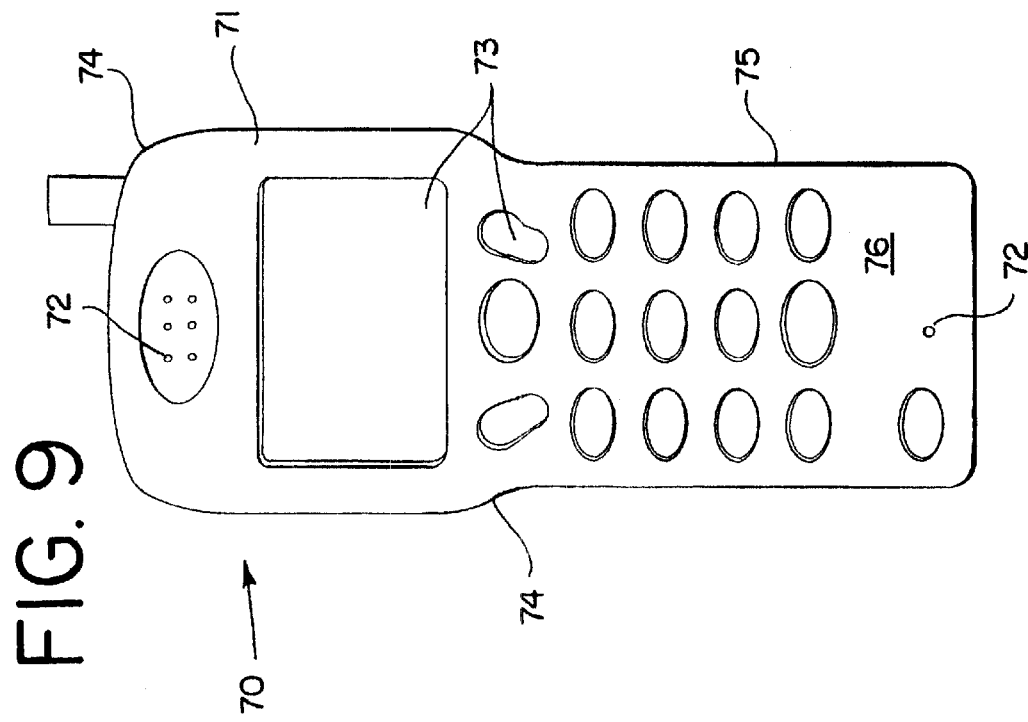
FIG. 9 is a top plan view of a conventional molded article formed by injection molding.

Turning first to FIG. 9, a molded article 70 is shown as a wireless telephone housing 71. The article 70 has a plurality of openings formed therein which range from small openings 72 used for the earphone and microphone to large openings 73 that receive bottoms and displays. The article 70 also has curved side surfaces, or contours 74 and these curved surfaces continue from the sidewalls 75 of the article to the front surface 76.

Figure 13:
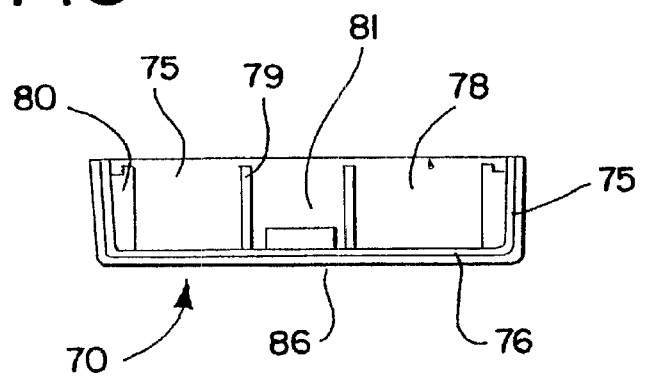
FIG. 13 is a cross-sectional view of the molded article of FIG. 12 illustrating the intimacy of the molded bonding between the decorative film and the injection molded article.

As shown best in FIG. 13, the article 70 includes a hollow body portion defined by a series of sidewalls 75 and a front, or top wall 76. These walls 75, 76 enclose and define an internal hollow cavity portion 78 which accommodates the internal circuitry and components of the telephone (not shown). In this regard, the article 70 has certain details formed with it in its cavity portion 78. Such details may include standoff members 79 that may support a circuit board, hollow bosses 80 that receive screws to hold the housing 71 to rear housing part (also not shown), and a hollow microphone recess 81 that receives a microphone element therein. It will be understood that although this detailed description will follow in terms of the telephone housing 71 illustrated, that the benefits and advantages of the present invention are not limited solely to such an article and that it may be equally used in the production of other molded articles.

As mentioned above, it is often desirable to decorate the exterior surfaces of the walls 75, 76 of the article. This may be done by molding the article in a single color or mixing different color molding materials together, such as plastic pellets. With such aspects one is limited to either a single color article or a variegated appearance with the mixed plastic. The present invention contemplates the application of a decorative film 85 to a selected surface of the molded article 70, in this case the exterior surface(s) of the article.

The Decorative Film Sheet

Figure 12:
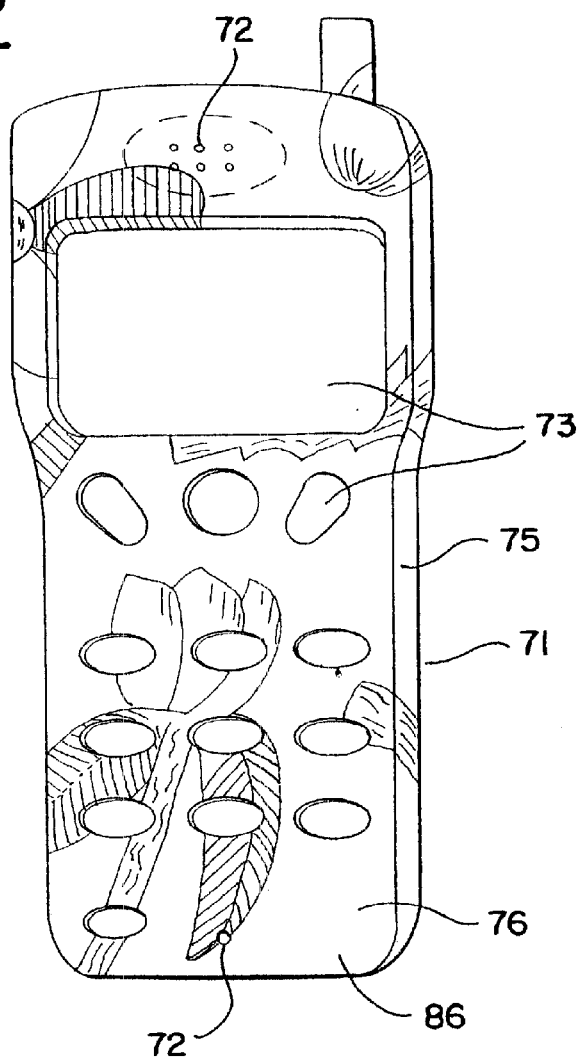
FIG. 12 is a perspective view of the article formed in the molded assembly of FIGS. 10 and 11, but with the excess portion of the decorative sheet removed therefrom to form a finished wireless telephone housing component.

Such an application is shown in FIG. 12, where a decorative pattern 86 has been applied to the exterior of the telephone housing. The decorative pattern 86 has previously been applied to a planar sheet 89 of film, preferably a plastic film. Examples of materials suitable for use as the film sheet 89 that exhibit desirable drawing qualities and thermal characteristics are ABS, polyester, polycarbonate, polyethylene and TPR. The film sheet 89 is preferably planar, as shown best in FIG. 10 in order to facilitate the decorating thereof such as, for example, by screen printing, photolithography, spray printing. Other methods may also be used.

A decorative pattern 86 is deposited on the film sheet 89 in a predetermined decoration area 90 that lies within the edges 91 of the film sheet 89. As explained in greater detail below, the decoration area 90 is preferably spaced apart from the edges 91 to define a series of marginal borders 92 that are present on all four sides of the decoration area 90. The decorative pattern 86 may include a series of detailed design elements as shown or it may include patches of color, letters, logos, etc. A sealing layer may be applied to the film sheet 89 over the pattern 86 thereon (and extend past the borders of the pattern 86) in order to give it a luster or glass or other desired finish and/or appearance characteristics as well as to, if desired, seal the pattern 86 to the film sheet 89. The decorative pattern 86 may be deposited on the film sheet 85 for eventual registration with a portion or portions of the finished molded article 20.

Figure 8:
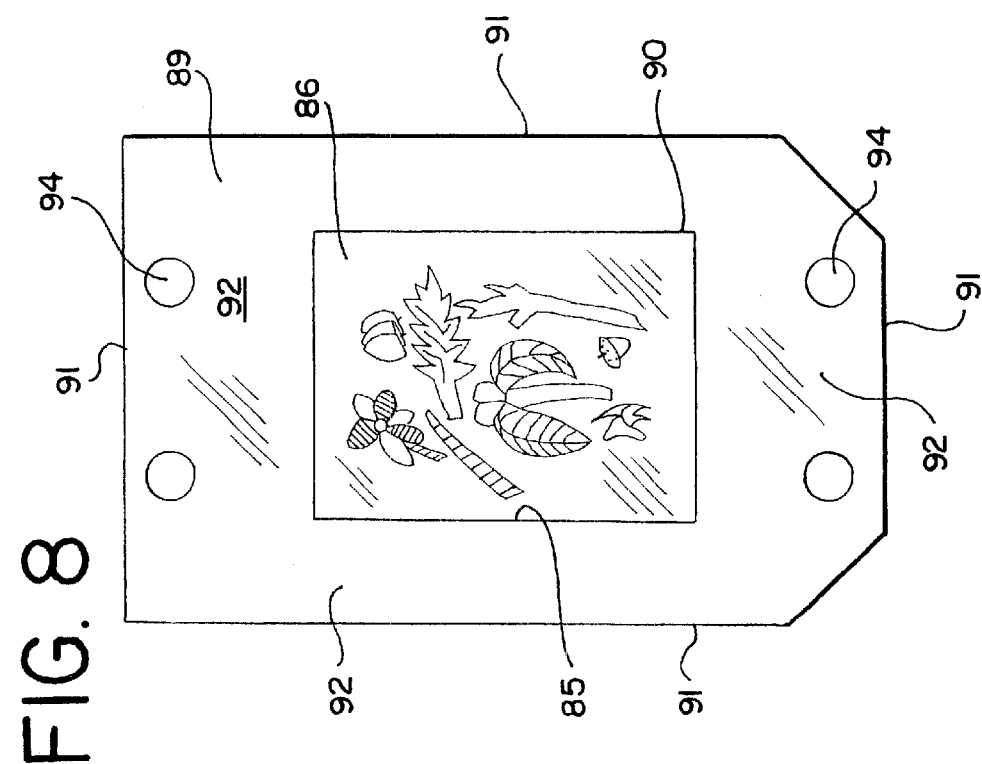
FIG. 8 is a plan view of a decorative film sheet used in the process of the present invention as shown in FIGS. 2–7 above.
Figure 11:
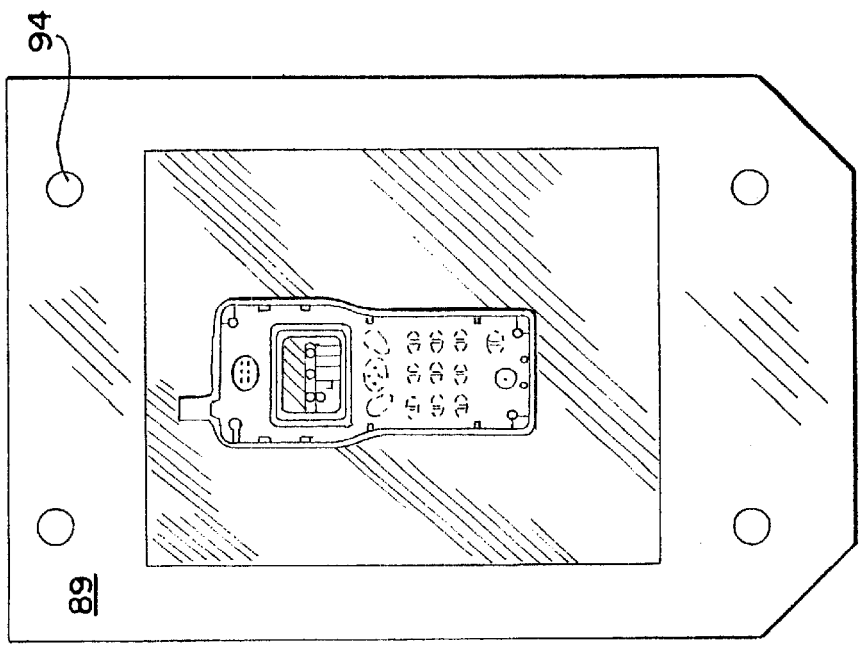
FIG. 11 is a bottom plan view of the molded assembly of FIG. 10 illustrating the detail side of the molded assembly.
Figure 10:
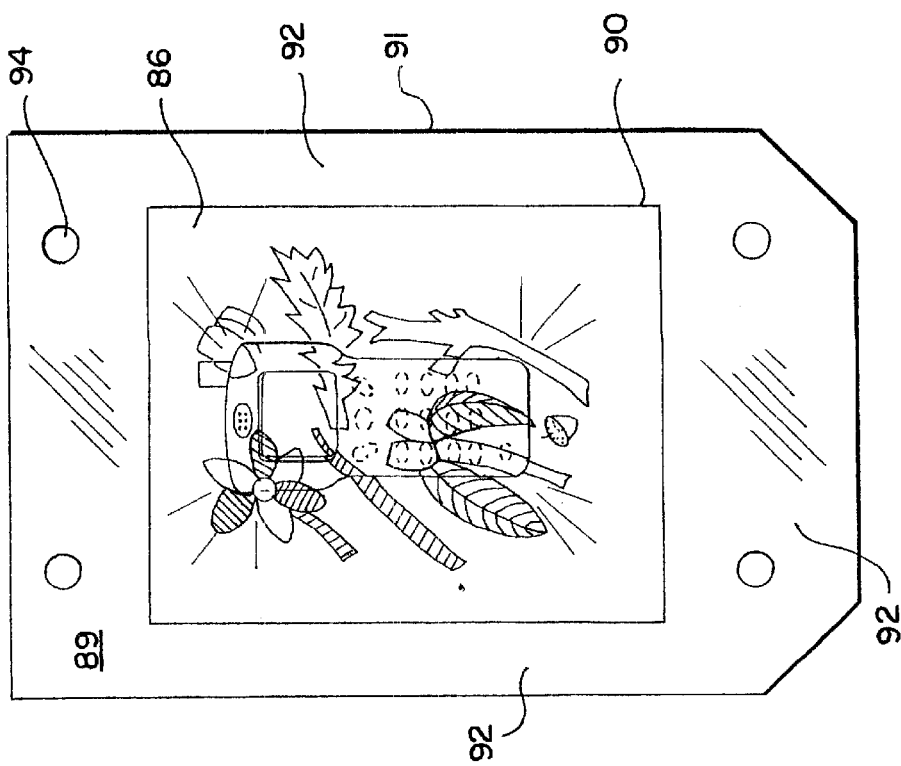
FIG. 10 is a top plan view of a molded assembly formed with the processes of the present invention in which a decorative film is intimately molded to the molded article, illustrated as a wireless telephone housing half, the assembly being shown as it is removed from the mold.

In this regard, means for registering the film sheet 85 with the details are part of the mold cavity, are preferably provided and are shown in FIGS. 8 and 10–11 as openings 94, illustrated as circular holes disposed within the marginal borders 92 of the film sheet 85 and between the decoration area 90 and the film sheet edges 91. Four such openings 94 are shown.

Once the decorative film sheet 85 is drawn into part of the mold cavity, a suitable molding material, such as a plastic, is injected in a molten state into the mold cavity. In most injection molding applications, particularly thermoplastic applications, the injected material will be in a high-temperature molten state, but it is contemplated that the present invention may also be used in non-thermoplastic applications where the molding material is not necessarily injected at an elevated temperature, but is injected under pressure. The resultant molded article 70 is illustrated in FIG. 13 and has the decorative film 85 intimately attached thereto and in effect, forming an exterior "skin" on the article 70. The decorative pattern 86 remains on the film sheet 85 and is thus applied to the exterior surface of the molded article 70.

The Hybrid Molding Process

Figure 1:
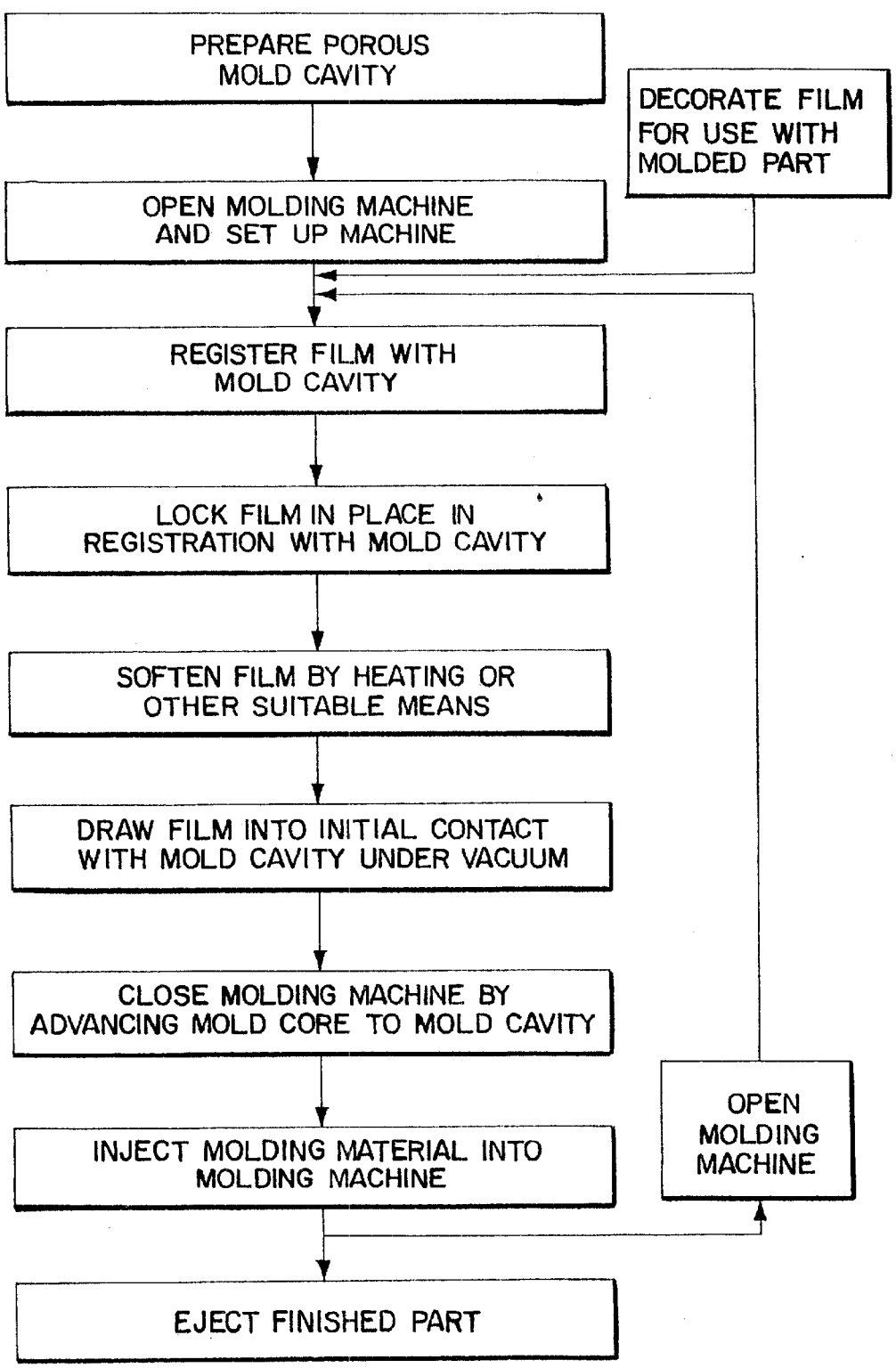
FIG. 1 is a simplified flowchart illustrating the steps of a combined insert-injection molding operation according to the principles of the present invention.
Figure 2:
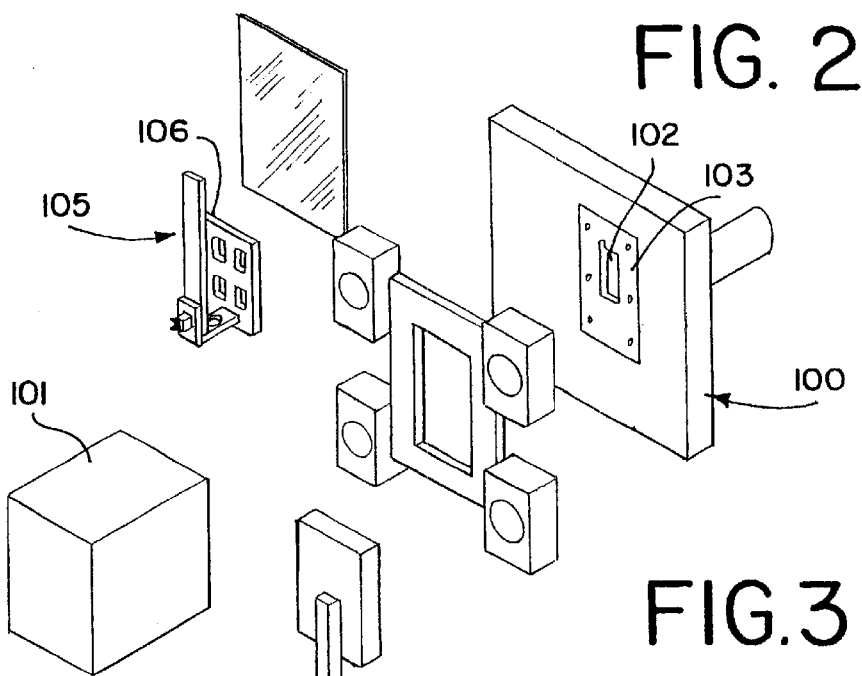
Figure 22:
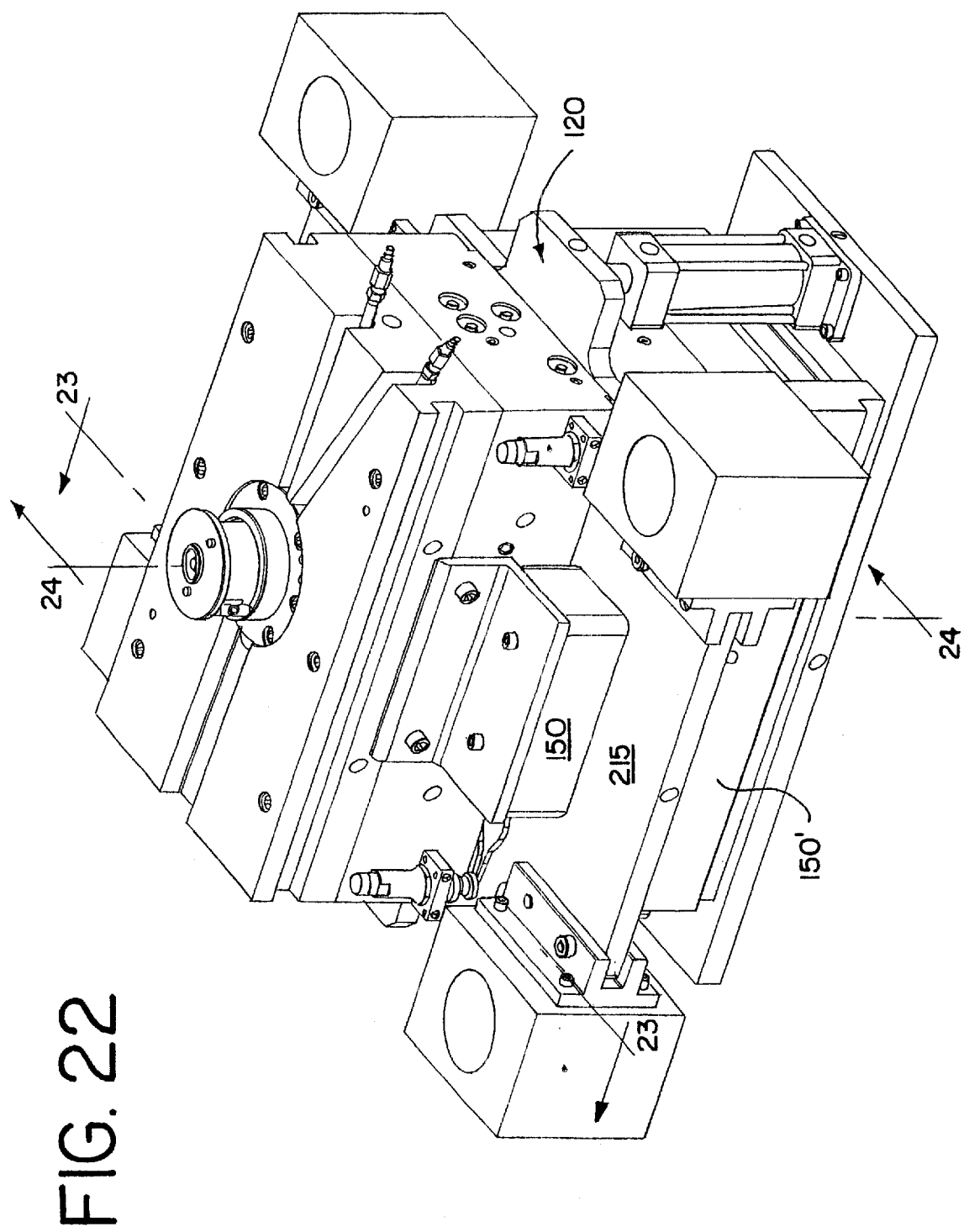
FIG. 22 is a perspective view of the components of FIGS. 20 and 21 joined together during an injection cycle.
Figure 23:
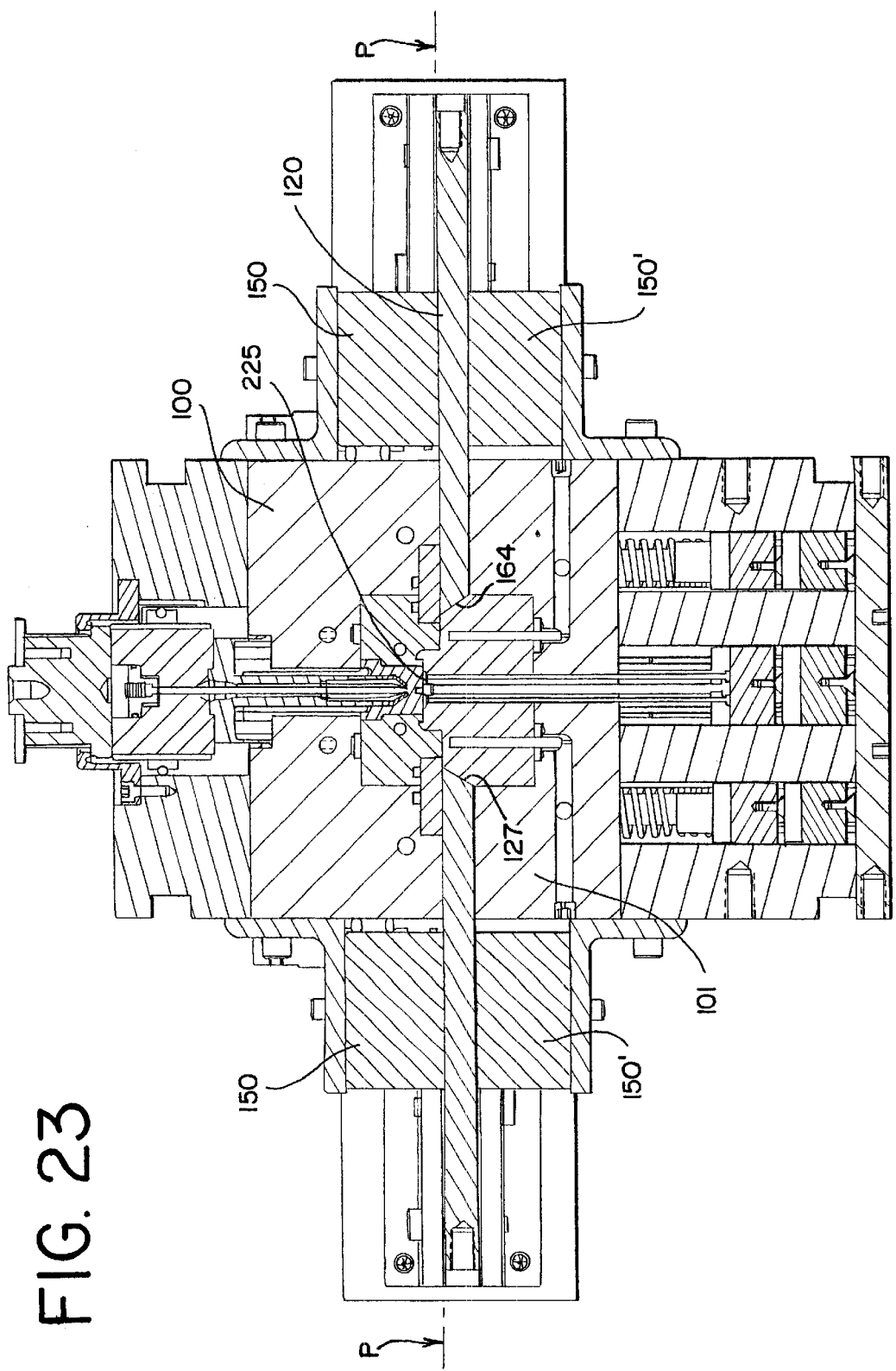
FIG. 23 is a cross-sectional view of the mold components of FIG. 22 taken along lines 23—23 thereof.

Referring now to FIGS. 2–7, the method steps of the present invention are shown in somewhat a schematic fashion. In FIG. 2, all of the process components are shown. An injection molding machine that has a pair of co-acting mold parts, or blocks 100, 101. One such block 100 is commonly referred to as a mold core block 100 or a female part because it has a cavity portion 102 disposed therein, with the cavity portion 102 being shown in place within an insert 103. This mold core block 100, within its interior cavity portion 102 will provide the exterior configuration to the molded article, i.e., the details and configuration shown in FIG. 9. The other mold block 101 is one that is referred to in the art as a male part or mold block 101 because it has detail portions that extend out therefrom and which are received in the cavity portion 102 when the two mold blocks 100, 101 are brought together. The detail and cavity portion cooperatively define, when brought together, the mold cavity of the molding machine into which a molding material is injected. This male part 101 is responsible for defining and forming the interior hollow cavity portion 28 of the molded article 70 (FIG. 13) and its associated internal details such as the standoffs 79, bosses 80, bases 81, etc. Hence, the term "detail." This aspect of the injection molding machine is described in greater detail to follow and is shown in FIGS. 22 and 23.

A placement arm 105, preferably a robotic placement arm, may be provided as a means for moving and positioning a film sheet 85 in place within the injection molding process components. The placement arm 105 is preferably capable of selective movement in all directions, such as along conventional spatial x-axes, y-axes and z-axes, such as those illustrated in FIG. 3. This three axis movement ensures accurate placement of the film sheet 89 onto one of the two mold blocks 100, 101. The placement arm 105 illustrated has a support surface 106 with a configuration that matches the configuration of both the film sheet 89 and the female mold block 100. Although this support surface 106 is illustrated as a planar surface, it will be understood that any other complimentary configurations may be used.

Figure 3:
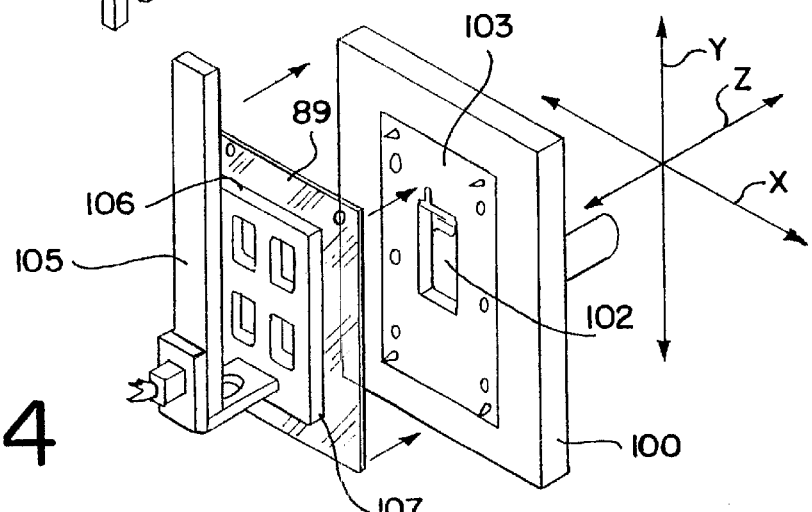
Figure 4:
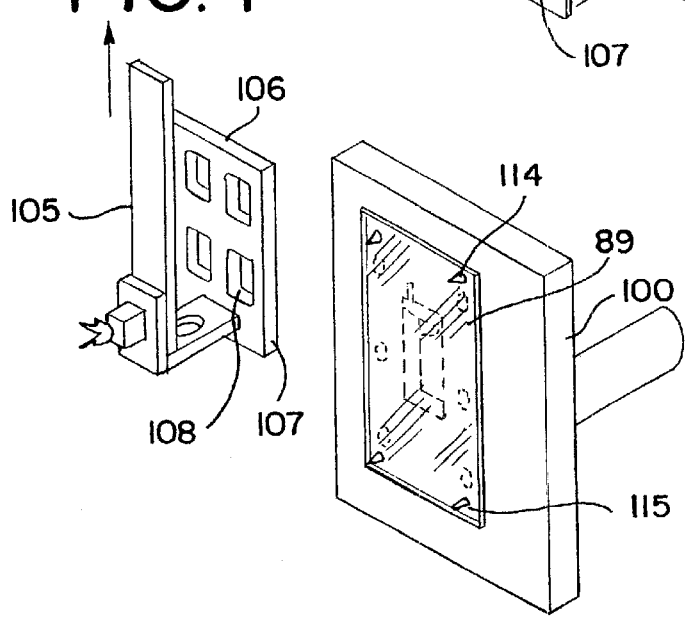

This support surface 106 is depicted as a flat platen 107 supported at the end of the placement arm 105 and which may have, as illustrated in FIGS. 2–4 a series of openings 108 formed therein, primarily to decrease the weight of the overall placement arm assembly. The placement arm 105 further has a means to hold or grip the film sheet 89 in place thereon, such as a vacuum-assisted mechanism, utilizing for example, individual suction cups 110 that have negative air pressure supplied thereto by way of associated tubing 111 (FIG. 17) that is connected to a source of negative air pressure or by means of a series of internal vacuum channels or passages that may be formed as part of the support surface and which communicate with the support surface 106 thereof.

The placement arm 105 is preferably controlled by a suitable control that is capable of selectively moving the placement arm 105 and its platen 107 as desired for placement of the film sheet 89 on one of the mold blocks 100, 101. Controllers such as computer-numeric controllers (CNCs) and programmable logic controllers (PLCs) are examples of suitable controllers to control the movement of the placement arm 105 in all directions defined by the three axes set forth earlier. The ability to place the film sheet 89 in a direction along the z-axis represents an improvement over the prior art decorating systems that merely use a sheet of film fed from a roll over a mold cavity. In order to assist in the placement and registration of the film sheet 89 onto the mold block 100, registration means may be provided that are associated with one of the two mold blocks.

One such means is illustrated as registration members in the form of pins 114 that are disposed upon one of the two mold blocks 100, 101, and are illustrated as disposed on and projecting from the female mold block 100. A minimum of two such registration pins 114 are needed to properly locate the film sheet 89, while three to four such pins are desirable. The film sheet has corresponding registration openings 94 formed in its associated marginal borders 92 that mate with and receive the registration pins 114. As shown best in FIGS. 3 & 4, for example, the registration pins 114 may take the form of tapered members, such as cones, which have tapered surfaces 115 that increase in diameter from the tip down to the base of the registration pins 114. These tapering surfaces 115 will engage and facilitate the guiding of the film sheet 89 into place on the mold block 100. The larger diameter of the registration pins 114 at their base portions preferably matches that of the film sheet openings 94 so that they will secure the film sheet in place over the mold core cavity 102. As such, when the vacuum or other gripping means of the placement arm 105 is released and the placement arm 105 is withdrawn from its interposed position, the film sheet 89 remains in place upon the mold block 100. In order to facilitate the effort of the placement arm 105 in placing the film sheet 89, the female mold block 100 is usually maintained in a stationary position during the molding process and the molded article is freed from the cavity portion 102 by rearward movement of the male mold block 101.

Figure 5:
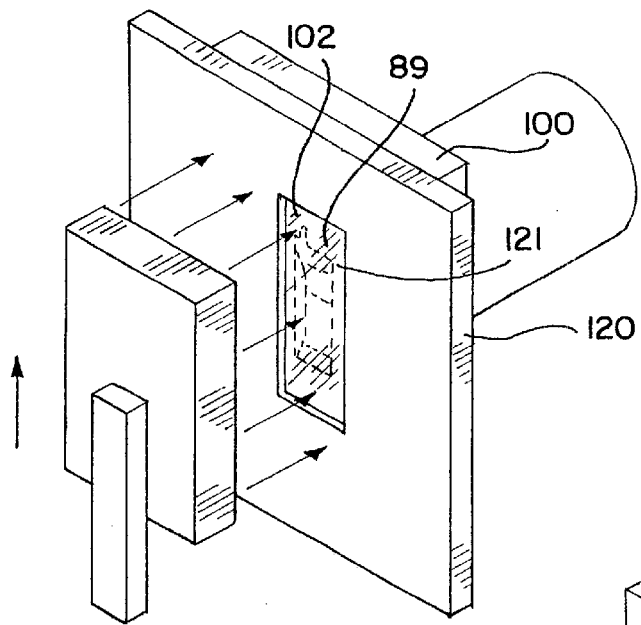

A retention mechanism is also employed in the process of the present invention in order to hold the film sheet 89 in place during injection molding. As shown schematically in FIG. 5, this mechanism preferably takes the form of a large retention plate 120 with an associated opening 121 formed therein that approximates the cavity portion 102 of the mold block 100. This opening 121 serves at least two distinct purposes. Firstly, it exposes a portion of the film sheet 89 so that a suitable heating means, such as a lamp, a heater or otherwise to be positioned in opposition to the film sheet 89. One such heater 130 is illustrated in FIG. 5. Secondly, the opening 121 permits the entry of the core detail head 160 of the other mold block 101, along with its associated male core detail tooling, into the mold core cavity 102. After the heating source 130 has softened the exposed portion of the film sheet 89 exposed through the retention plate opening 121 to a sufficiently flexible state to permit it to bend and deform, negative air pressure is applied to the mold core cavity 102 and because of the structure of the mold core cavity as explained in greater detail below, the film sheet 89 is drawn completely into the mold cavity 102.

Figure 6:
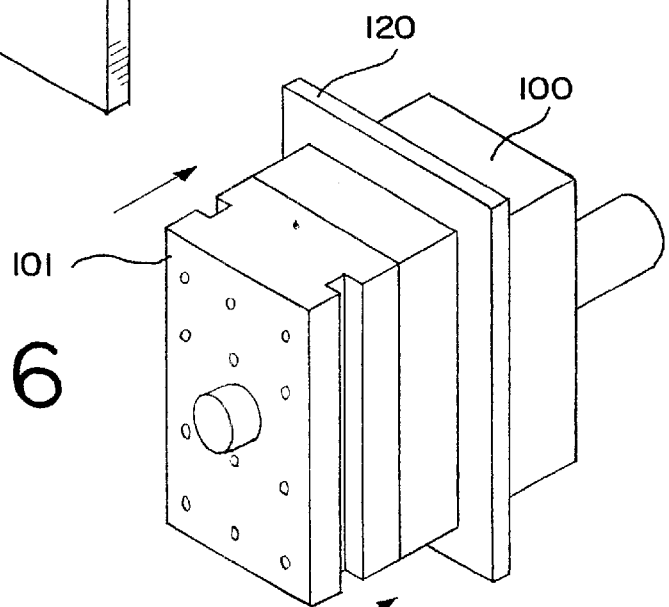
Figure 7:
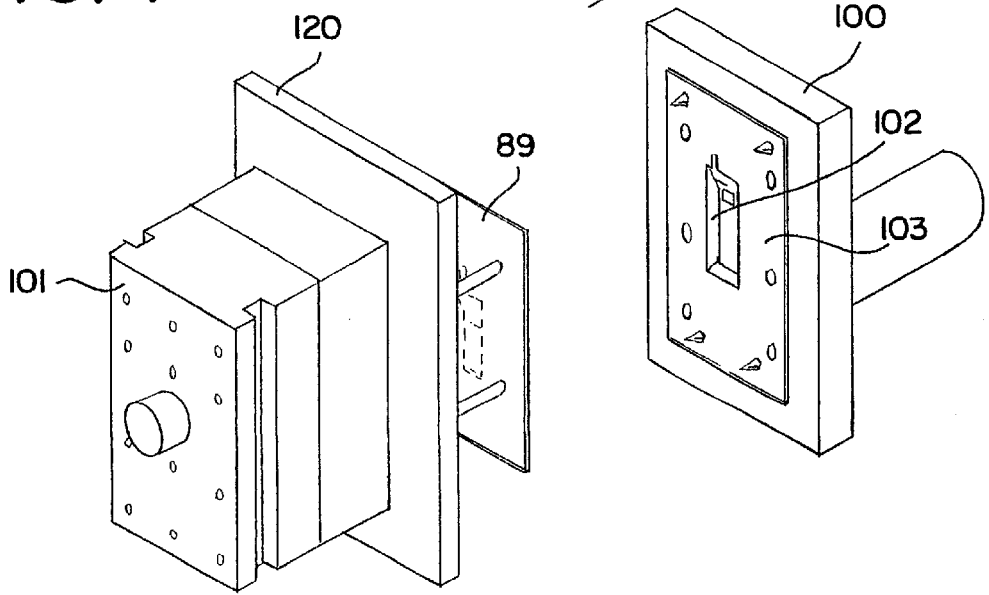

Once the film sheet 89 is drawn into the mold core cavity 102, the other mold block 101 (i.e., the male part of the mold as illustrated in the drawings) is brought into engagement with the retention plate 120 and the other mold block 100 to form the assembly shown in FIG. 6. A liquid molding material is subsequently injected into the mold cavity now formed between the two mold blocks 100, 101. This molding material may be a thermoplastic resin or other material that is injected under pressure and elevated temperatures, or it may be a molding material that is injected only under pressure. When the molding material has set, the two mold blocks 100, 101 are disengaged and one of the two mold blocks 101 is drawn apart from the other mold block 100 as illustrated in FIG. 7, thereby puling the film sheet 89 out from the cavity portion 102.

At this stage of the process, the film sheet has the form illustrated in FIGS. 10 and 11, where a molded article 70, such as the telephone housing 71, is integrally molded to the film sheet 89. The pattern on what is considered the front face of the film sheet 89, as shown in FIG. 10, conforms to the exterior surfaces 74, 76 of the article 70 in what is believed to be an intimate and integral attachment. In this regard, the film sheet 89 may be considered as a "skin" of the molded article 70. The internal details 79–81 of the article 70 are present and accessible from the rear of the film sheet 89 as illustrated in FIG. 11. The article 70 is then trimmed from the film sheet 89 in a conventional manner to form a decorated molded article as shown in FIG. 12.

The Hybrid Injection Molding Machine

Figure 14:
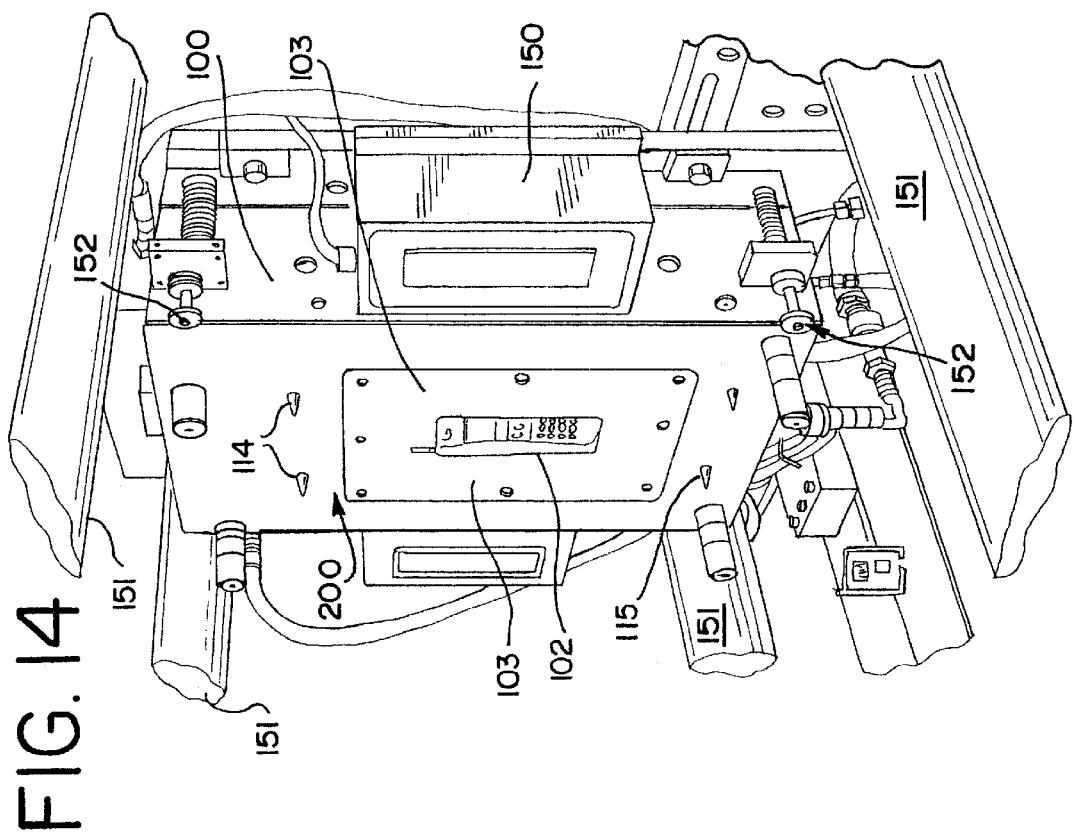
FIG. 14 is a perspective view of the cavity side of an injection molding machine illustrating a mold cavity formed in accordance with the principles of the present invention, and illustrated in an open, ready position on the injection molding machine.

The processes of the present invention can be easily accomplished with a conventional injection molding machine that has been modified slightly. Turning now to FIG. 14, one portion of an injection molding machine that has been modified in accordance with the principles of the present invention is illustrated generally at 200. One half of the machine is illustrated, namely the female mold block 100 having a cavity portion 102 formed within an insert portion 103. The female mold block 100 has a series of electromagnets 150 associated therewith and the male mold block has a series of electromagnets 150' associated therewith. These electromagnets 150 are controlled by a machine controller, or other control means (not shown) and may be selectively energized for the purpose of holding a retention plate 120 in place over the mold block 100.

Figure 20:
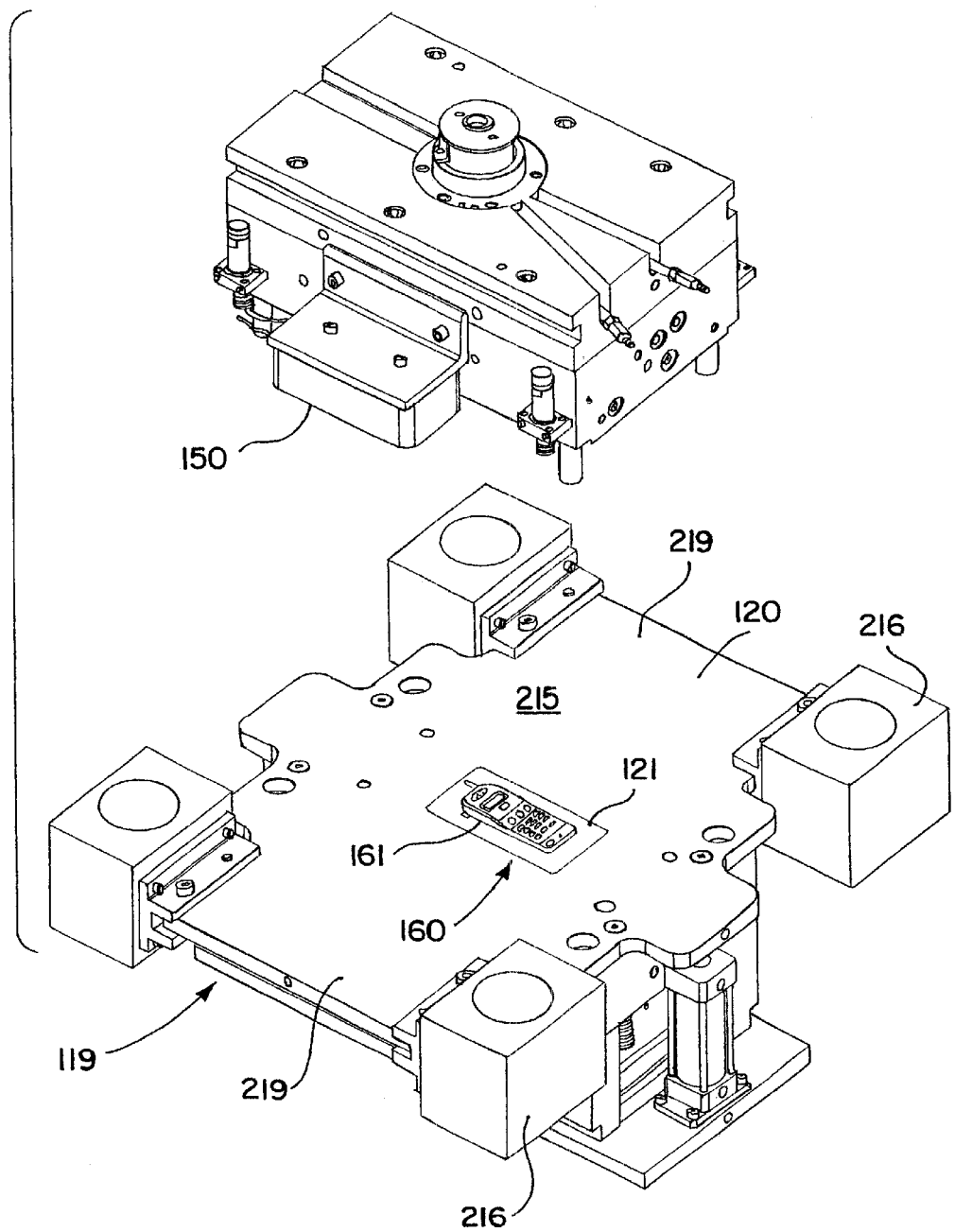
FIG. 20 is a perspective isolated view, taken from above, of the major components of the molding machine of the present invention, illustrating the film retention plate in place over the mold detail block and spaced apart from the mold core block.
Figure 21:
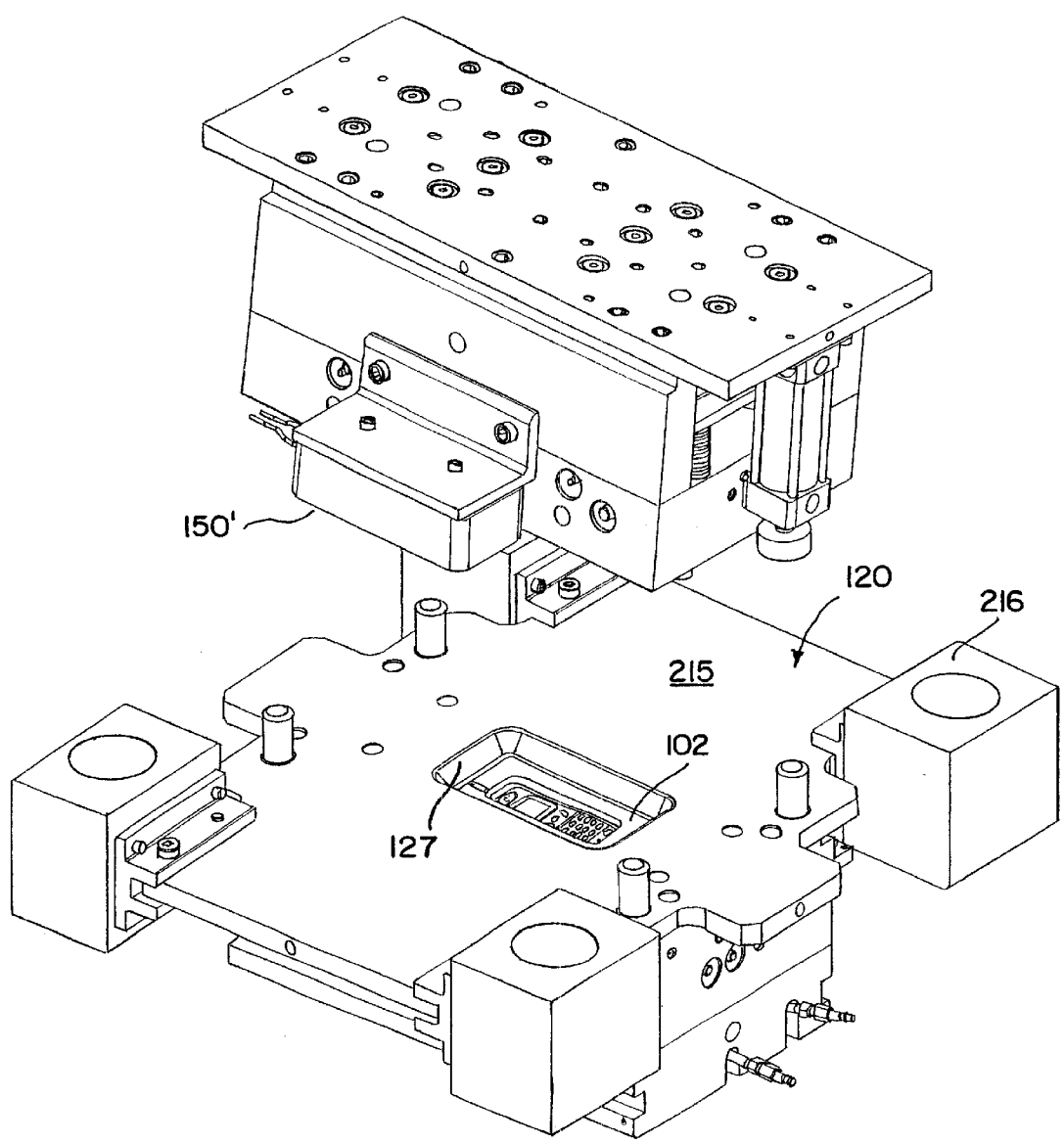
FIG. 21 is an obverse view of FIG. 20 with the film retention plate illustrated in place on the mold core block.

In a unique aspect of the invention and as indicated above, the electromagnets may be selectively energized so that they may adhere to either side of the retention plate 120. This aspect permits the electromagnets 150 to retain the retention plate 120 in place upon the female mold block 100 in the pre-injection and injection phases of the process (FIGS. 3, 4 & 21), but retain the retention plate 120 (by way of electromagnets 150') in place on the male mold block 101 during the ejection phase of the process (FIGS. 7 & 20). This is most effectively accomplished by first energizing the first electromagnets 150 and subsequently de-energizing the first electromagnets 150, while energizing the second electromagnets 150'.

The mold block 100 is interposed between a series of rails 15, that extend the length of the machine and provide a means for the components of the machine to slide into and out of engagement of with each other. Associated with the mold block 100 are position indicators 152 that may be positioned alongside the mold block 100. These indicators may be linked to pneumatic, or other operators (not shown) and will depress upon contact of an opposing block or sensor disposed on the other mold block 100 to thereby signal their positions to the controller.

Figure 15:
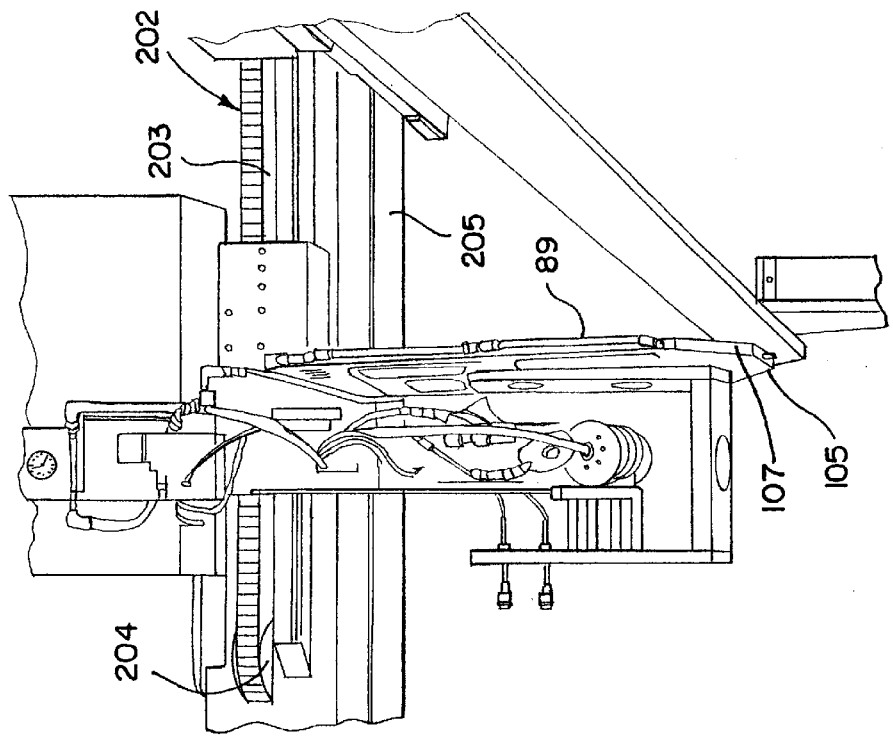
FIG. 15 is a perspective view, taken from below, of a robotic placement arm and film carrier used to place a decorative film in registration on the mold cavity block.

As mentioned above, a placement arm 105 is associated with the machine 200. This placement arm is shown in FIGS. 15–17 and is supported on a drive assembly 202 shown as having a belt 203 driven by gears 204 and enclosed within a housing 205. This drive assembly 202 moves the placement arm 105 in the Z-axis direction. The placement arm 105 is movable in the vertical direction (along the Y-axis) by a push rod or power cylinder mechanism 208. A similar mechanism 209 on the assembly will control movement in the X-axis.

The placement arm 105 has a support surface 106 disposed on a flat member, such as a platen or frame 107. The framework 107 has a series of openings 108 decrease the weight of the overall frame member 107. In order for the frame member 107 to hold or grip the film sheet 89 effectively, a gripping means is provided. In the preferred embodiment illustrated, this gripping means utilizes a vacuum gripping system. Negative air pressure is supplied by way of pneumatic tubing 111 that extends to either vacuum cups 110 or channels that are formed in the body of the frame member 107. This type of gripping mechanism holds the film sheet 89 flat on the support surface 106. The frame member 107 also has a series of openings 211 that are coincident with the registration openings 94 formed in the film sheet 89. The frame member is openings 211 will receive the registration pins 114 of the mold block 100.

The placement arm 105, as mentioned above, is utilized to deposit the film sheet 89 in place on the mold block 100. In this step, the film sheet registration openings 94 are aligned with and placed over the registration pins 114 of the mold block 100. The diameter of the base of these registration pins 114 should closely match that of the film sheet openings 94 so as to hold the film sheet 89 in place initially. A retention mechanism 119 is provided to retain the film sheet 89 in place on the mold block 100. This includes a retention member in the form of a plate 120. As illustrated in FIG. 18, this plate 120 includes a flat portion 215 that includes four blocks 216 with openings 217 that are received on the machine rails 151. These blocks 216 are slidable on the rails 151 along the z-axis of the machine 200.

The retention plate 120 has a preselected thickness with an opening 121 disposed therein. The opening 121 is disposed in the retention plate 120 in alignment with both of the core cavity or the core detail portions of the female and male mold blocks 100, 101. The retention plate 120 is metal in the preferred embodiment so that it may be held in place by the electromagnets 150 on either side of the retention plate 120. In this regard, the retention plate 120 has preselected side portions 219 that extend outwardly so that they contact the electromagnets 150 on either side of the mold assembly parting line P—P.

Figure 24:
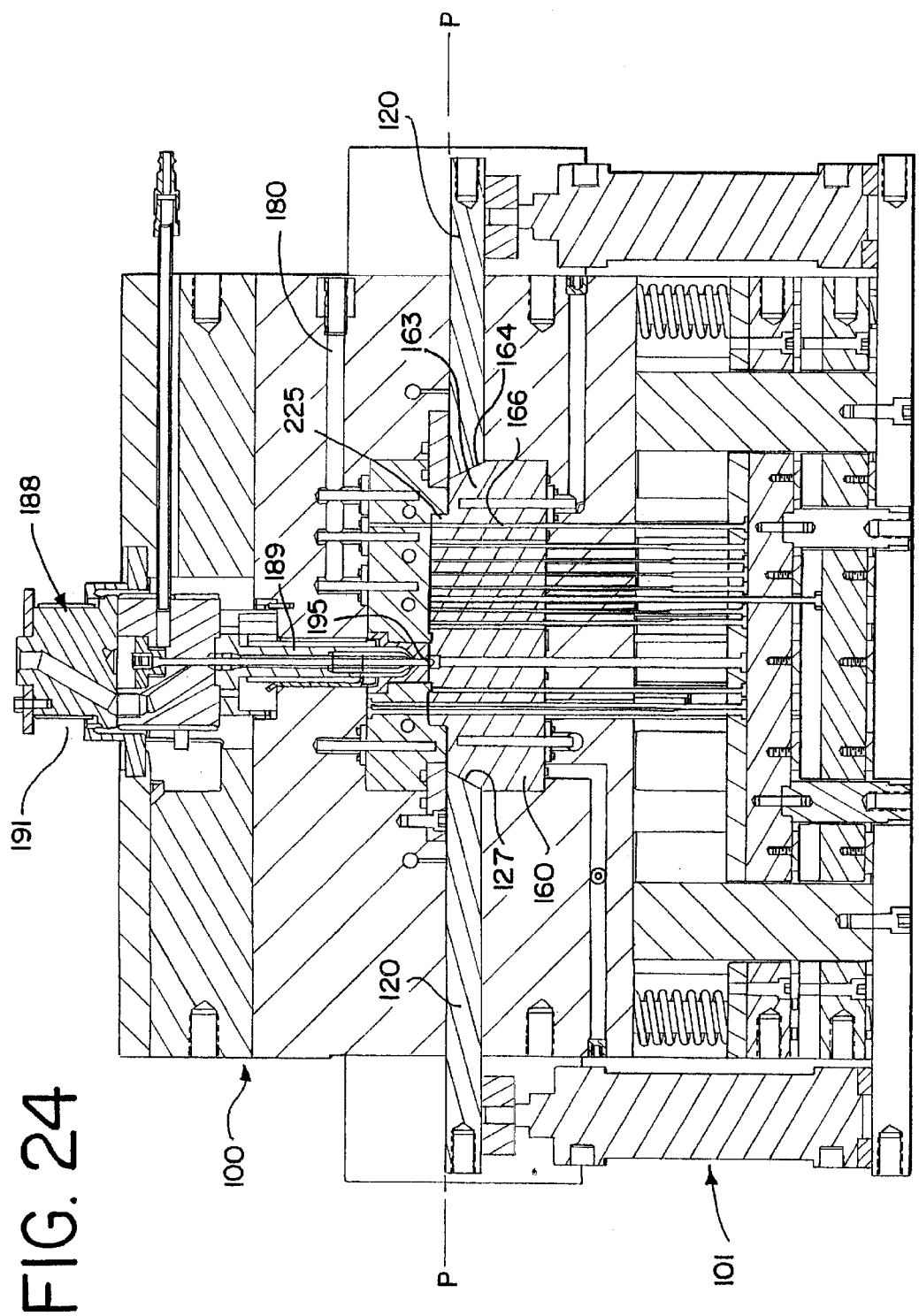
FIG. 24 is a cross-sectional view similar to FIG. 23, but taken along lines 24—24 thereof.
Figure 25:
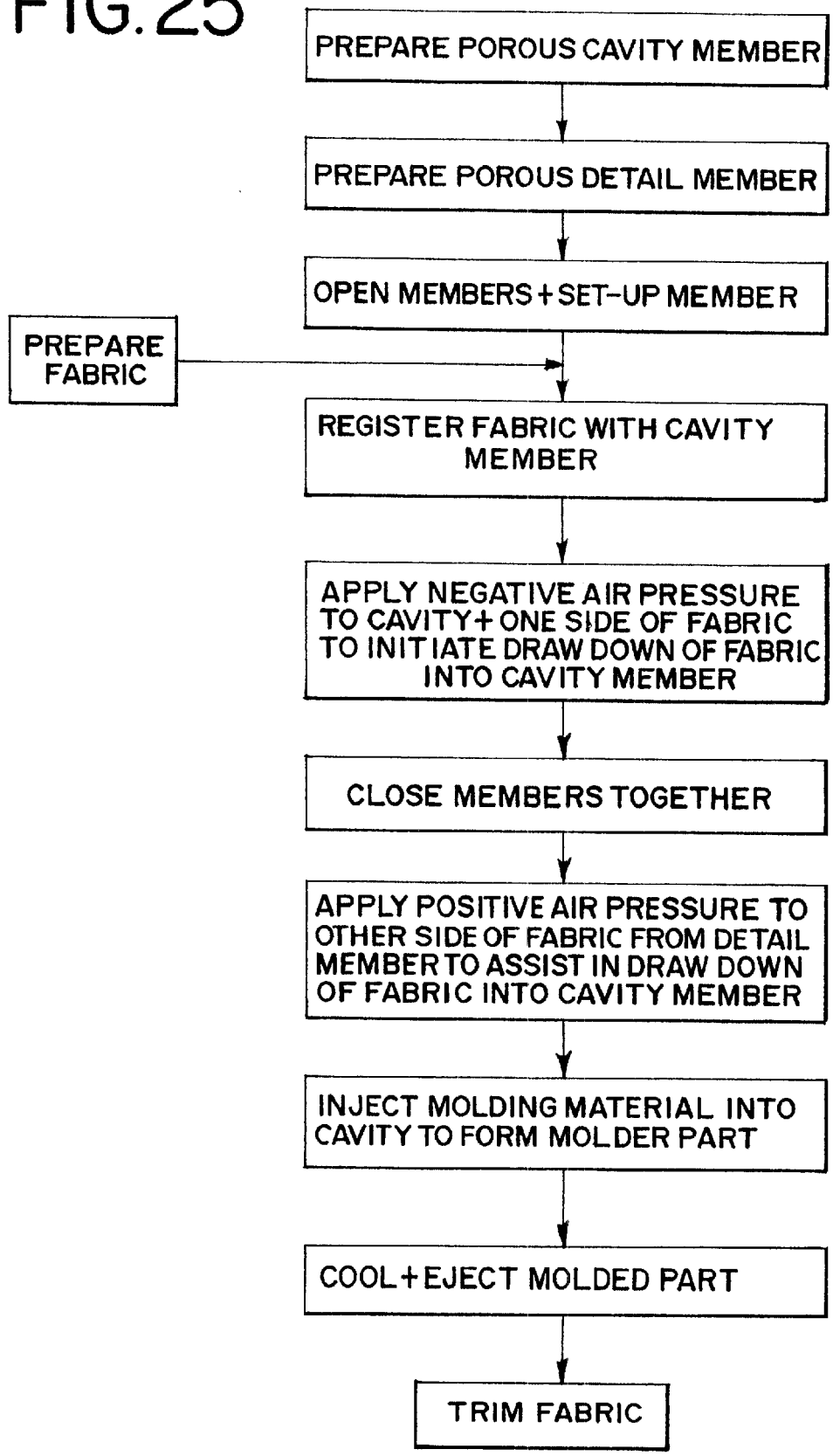
FIG. 25 is a flow chart illustrating the steps of another embodiment of a hybrid injection molding process according to the principles of the present invention.

The opening 121 in the retention plate 120 is aligned with and preferably slightly larger than the mold core cavity portion 102 (FIG. 21) or the mold core detail portion 160 with its projecting tooling 161. This opening 121 permits the two mold blocks 100, 101 to be brought together to from a final interval mold cavity 225. This is shown in FIGS. 23 and 24 with FIG. 23 illustrating a transverse cross-section and FIG. 24 illustrating a longitudinal cross-section.

As shown in these two figures, the core detail head portion 160 projects slightly past the face 163 of the male mold block 101. The core detail tooling portion has tapered shoulder portions 164. These tapered, or chamfered, shoulder portions 164 preferably extend all around the core detail head portion 160, and are complementary in configuration to the interior perimeter 127 of the retention plate opening 121 to provide a sound engagement therebetween. This only requires the base portion 163 of the core detail tooling 161 to be extended and therefore it occurs in the relatively larger base section 163 of the core detail tooling portion 160 to eliminate any detrimental stresses from developing in the more finely structured tooling details 161.

It can be seen that the combination of these two surfaces permits all three components: the male and female mold blocks 101, 100 and the retention plate 120, to interfit together without providing any further openings in the associated mold blocks 100, 101 where leakage may occur. By tapering these surfaces, the film sheet 89 may be maintained on the original parting line P—P of the mold assembly.

In an important aspect of the present invention, the mold core insert 103, and specifically the mold core cavity portion 102 thereof is formed from a porous metal material, such as that which is sold in the trade under the trade name "PORCERAX" sold by International Mold Steel, Inc. Of Japan. This material has a porosity such that approximately 40% of the total volume of the metal is made up of minute air passages. The pores of this type of metal are such that they are small enough to prevent the passage of plastic or resin particles therethrough, but are large enough to permit the passage of air and gas molecules, so as to permit the venting of gases from the mold. In this regard, we have discovered that an even vacuum may be effectively drawn through the porous material.

In the application of the present invention, the porous material forms the mold core cavity and one or more vacuum lines 180 that lead to areas within the insert 103. (FIG. 24.) Negative air pressure is applied to these lines and a vacuum is drawn on the core cavity 102. This vacuum is drawn somewhat evenly for it is drawn through all areas of the core cavity 102 that are formed from the porous material. This is usually effective in drawing the entire film sheet exposed area into the mold core cavity 102 with almost full drawing occurring.

In some instances, complete drawdown of the film sheet 89 will not occur, and in order to facilitate entry of the film sheet 89 into the mold core cavity 102, either the entire core detail head portion 160 or selected portions thereof may also be formed from a similarly porous material. This porous material will permit positive air pressure to be applied through the core detail head portion 160 in opposition to the film sheet 89 by way of pneumatic passages 166 that are preferably formed in the male mold block 101 and in the core detail head portion 160. In instances where the film sheet 89 is not completely drawn into the cavity, the application of positive air pressure through the core detail head portion 160, will serve to force the film sheet 89 into all crevices, corners, etc. of the core cavity to an extent such that the film sheet 89 and the core detail head portion 160 cooperatively define a molding cavity into which the molding material may be injected.

In one aspect of the present invention, the injection molding head 188 is associated with the female mold block 100 and is thus "gated" therethrough into the mold cavity 25, meaning that the molding material is injected into the cavity portion 102 through the film sheet 89. The molding head 188 may include a heated nozzle 189 having a central passage that is heated by conventional heating means 190 disposed in proximity to the nozzle 189. The molding head 188 may have an engagement base 191 that is engaged by an extruder (not shown) in a conventional manner in order to provide a supply of molding material to the injection head 188, where it is heated and passed into the final mold cavity 225. Both molding blocks 100, 101 are mounted in a manner so that they may be selectively brought together and drawn apart. As mentioned previously, the female mold block 100 may be maintained stationary and the male mold block 101 moved in and out of contact therewith.

A conventional locking means for locking the two mold blocks 100, 101 together may be provided. One or more shock absorbers, such as snubbers 192 may be provided in association with one of the two mold blocks, shown as the male mold block in FIG. 22 to absorb some of the massive forces that are encountered due to closing of the mold block assembly and/or due to injection pressure.

The injection nozzle 189 has a tip end portion 195 that is gated to the mold core cavity 102. In the mold assembly illustrated, this gate 195 is located in an area that is normally trimmed away from the final product, such as in the display window 73. The heat of the molten molding material and the injection pressure combine to develop a force sufficient to pierce the film sheet 89 at its gated location 73. Once the film sheet is pierced, the molding material impinges against the male mold block 101 so that any portion of the core detail head portion 160 that opposes the injection nozzle thereby serves as a reaction surface to direct the injected molding material into all parts of the mold cavity 225. The injection pressure of this material may further assist in extending the plastic film sheet into contact with all surfaces of the mold core cavity 102.

The resultant molded film sheet-article assembly has the film sheet 89 integrally attached to it as shown in FIGS. 10 & 11. The film sheet 89 acts as a "skin" to the molded article, as referred to above. This film sheet-article assembly is then ejected from the mold by any suitable means such as ejection pins and the like. The excess marginal area of the film sheet 89 is then trimmed from the article by any conventional means. The process is repeated again to mold another article.

Significantly, the film may be placed robotically in virtually exact registration on the designated mold block. Although the female mold block 100 has been used in this description as supporting the film sheet 89, the other, male mold block may be used to support the film, provided that it has a flat surface surrounding its core detail portion that will support the film sheet 89 in a flat orientation and that the detail tooling 163 does not interfere with the film sheet. The ability of the placement arm 105 to move in three different directions enables the placement arm 105 to deposit the film sheet 89 in an exact position on the mold block time after time.

Application of a Fabric to the Molded Article

The prior embodiments have been concerned with a hybrid molding process using a decorative film sheet. The present invention may also be utilized to mold a fabric to the molded article 70. In this embodiment of the invention, a fabric sheet 300 is registered with the cavity so that it is interposed between the two mold blocks 100, 101 and the fabric sheet 300 is thereupon incorporated into the molding process. In this embodiment, the fabric in essence, becomes a "skin" of the molded article.

Due to the use of positive and negative air pressure in the processes of this embodiment, it is preferred to use a fabric that is either porous such as a rubber or latex fabric or a pressed material such as a felt. Other fabrics that may have a coarse or fine weave that transmits air therethrough will typically require a plastic or other fabric backing member 301 applied to one side thereof as shown in FIG. 26. This backing member, or layer 301, serves to reduce the porosity of the fabric 300. In this regard, it is believed that if a fabric blocks between about 70% to about 100% of air pressure directed at it, it will be sufficiently impermeable to be used with the present invention and drawn down under the urging of the positive and negative pressure without requiring the need for a sealing layer to be applied thereto. Such a sealing layer may be applied separately to it or it may be applied to the fabric by way of the carrier sheet described above. In actual applications, polyurethane fabrics and felts have been successfully bonded to molded articles during the molding process as have rubber and latex fabrics. Suitable backing members for other conventional fabrics such as wool, synthetic and blended fabrics have included cotton, polyester and vinyl backing layers. Other layers should also prove successful in sealing the fabric.

The backing layer may be incorporated into a carrier assembly. FIG. 27 illustrates one means 302 of interposing the fabric sheet 300 between the male and female parts of the mold. This means includes a carrier sheet 302, similar to the decorative film mentioned previously in this application. Moreover, the material from which this sheet is made will be thinner and ideally more flexible than the aforementioned film sheet 89. Preferably, it may be formed from a polyester or vinyl material and will serve primarily as a support member for a sheet of fabric 304.

The carrier sheet 302 has preselected dimensions that permit it to be utilized with a molding machine, such as that shown in FIGS. 14–17. The carrier sheet 302 has an inner decorative area 310 to which a sheet of fabric 300 has been applied. The carrier sheet 302 is larger than the fabric sheet 300 so as to provide an outer marginal area 312. This area 312 may include registration openings 313 that are engageable with registration members or pins 114, 115 that may project from the female mold member 100 as shown in FIG. 14. Those pins 114, 115 will serve to hold the carrier sheet 302 and its fabric in registration with and over the cavity 102 of your mold member 100. In this embodiment, the carrier sheet 302 may be moved into place on the mold member 100 by use of a robotic placement arm 105 in the manner described hereinabove with respect to FIGS. 15–17. With the use of such a carrier sheet 302, the fabric 300 could be firmly located between the two mold members 101, 102 by way of the retention plate 120 that would be operated in the manner described above.

After molding and ejection, the molded article 325 will have, as illustrated in FIG. 28, the fabric 300 applied to its exterior surface 326, with the backing material of the carrier sheet 302 being bonded to the article 325. The fabric 300 is applied to the exterior surface 326 of the article that is defined by the internal contours of the female mold member cavity 102. The inner parts of the article 325 such as posts and lugs 327 shown in FIG. 28, are defined by the exterior contours of the detail portions 161 of the male mold member 101.

FIG. 29 illustrates an alternate way of positioning the fabric 300 over the cavity of the female mold member 100. In this embodiment, a roll 315 of fabric is mounted on rollers 316 that are operatively connected to a drive mechanism, such as a motor or step motor or the like and the sheet of fabric 300 is threaded into guide members, such as rails 317 that may be positioned on the face 318 of the female mold member 100. These rails 37 may be received within corresponding recesses 319 formed in a retention plate 120, the purpose of the plate 120 being to retain the fabric sheet 300 on the female mold member 100 and to preferably create a substantial air-tight seal between the mold cavity 102 and the fabric sheet 300 for purposes explained later herein. These guides may be passive guides and only serve to direct the fabric in its travel across the female mold member 100 or they may be active guides that grip and hold the fabric 300 in place once it has been positioned over the cavity 102 of the female mole member 100. Other guiding and placement means may be used, such as a lock and pinion driven assembly or a tractor belt assembly that will pull the fabric over the mold cavity 102.

Irrespective of the means of positioning the fabric sheet 300, it is preferred that the fabric sheet 300 be positioned at the parting line (or the interface) between the male and female mold members 100, 101 and in a manner such that a substantial air or gas tight seal is maintained between the fabric sheet 300 and the female member mold cavity 102. This is to facilitate the drawing of the fabric sheet 300 into the mold cavity 102. In this regard, the fabric 300 should also be mostly air impermeable of a highly effective nature that prevents about 70% to about 100% of air divided at a surface thereof.

Figure 30:
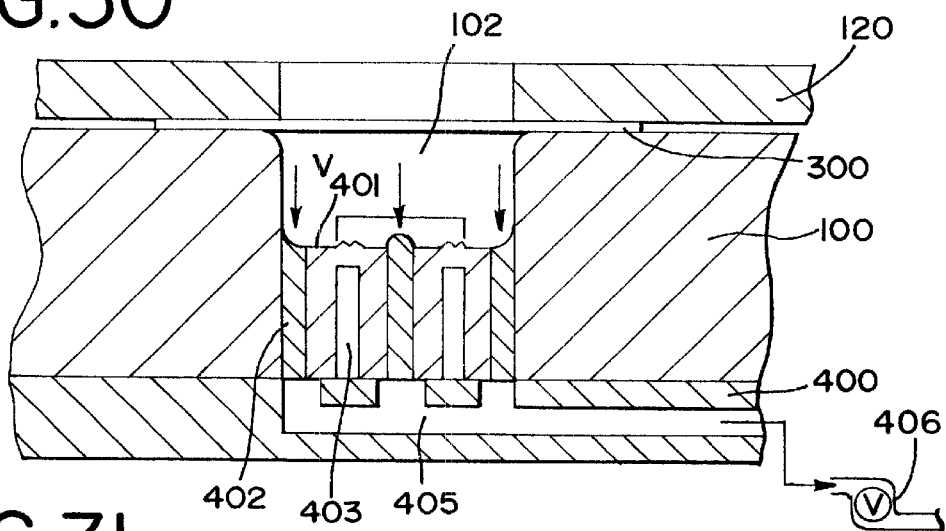
FIG. 30 is a schematic cross-sectional view of a fabric registered with a mold cavity and held in place by a retention plate.

Once the fabric is positioned as shown schematically in FIG. 30, negative air pressure is applied to the cavity 102 of the female mold member 100 by drawing a vacuum through the porous inserts 402 of the female mold member 100. This vacuum is shown by the arrows V in FIG. 30 and may be generated by a vacuum pump 406 connected to air passages 405 formed in the female mold member 100. These inserts 402 are preferably arranged in a pattern along the interior faces 401 of the cavity 102 and may be positioned in a pattern that ensures effective draw-down of the fabric 300 into the cavity 102. Cooling channels 402 may be provided in the manner known in the art to provide cooling to the cavity 102.

Figure 33:
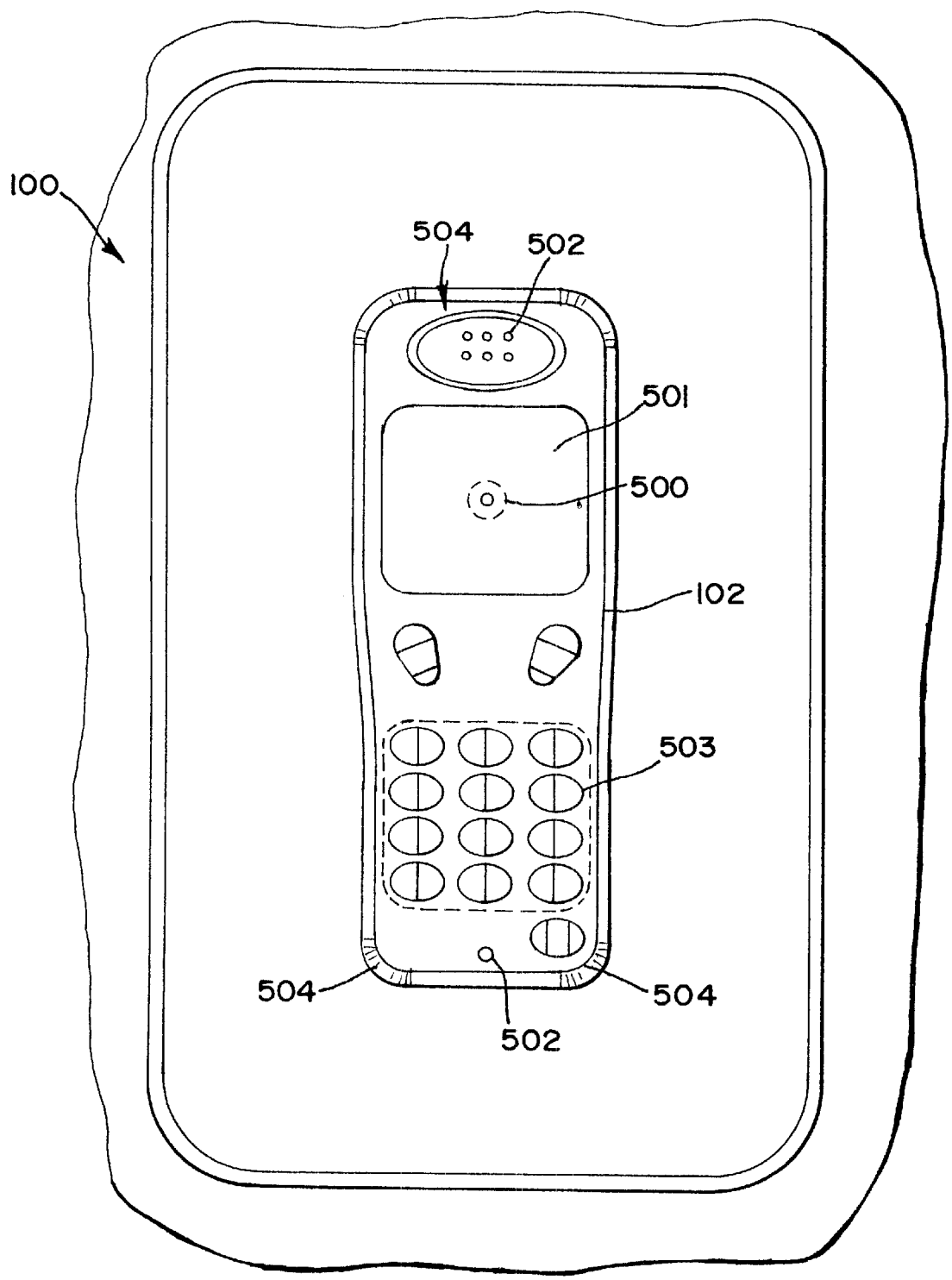

FIG. 33 illustrates, in plan view, a portion of a female mold member 100, and in particular, a cavity 102 formed therein. The cavity 102 shown takes the configuration of a wireless telephone, such as is shown in FIG. 9. The cavity 102 contains the injection molding gate 500 that communicates with the cavity 102 in order to convey molding material, such as plastic or resin onto the interior cavity formed when the two mold members 100, 101 are brought together. Because the fabric 300 is drawn into this cavity 102, the heat and pressure of the injected material passing through the gate 500 (which is illustrated as located in an area if the telephone housing that will later be stamped out) will pierce the fabric 300 overlying it and enter the cavity 102.

As mentioned previously, the entire cavity 102 may be made of a porous material. It is preferred in some applications that the porous material not be used in some portions of the cavity 102, such as the area 501 immediately surrounding the gate 500 or the areas where the two mold members 100, 101 may meet in metal to metal contact such as the microphone holes 502 and which are open in the final article. The porous material may also be used, as mentioned above in one or more inserts within preferred locations such as in locations where the fabric is drawn deepest into the cavity 102. This is illustrated in FIG. 33 in the general area 503 enclosed within the dashed line, or at the portions 504 that are approximately the farthest away from the gate 500. Other locations may be used to obtain an even and useful drawdown. The same holds true for the detail portion and its function of providing positive air pressure to the cavity.

Figure 31:
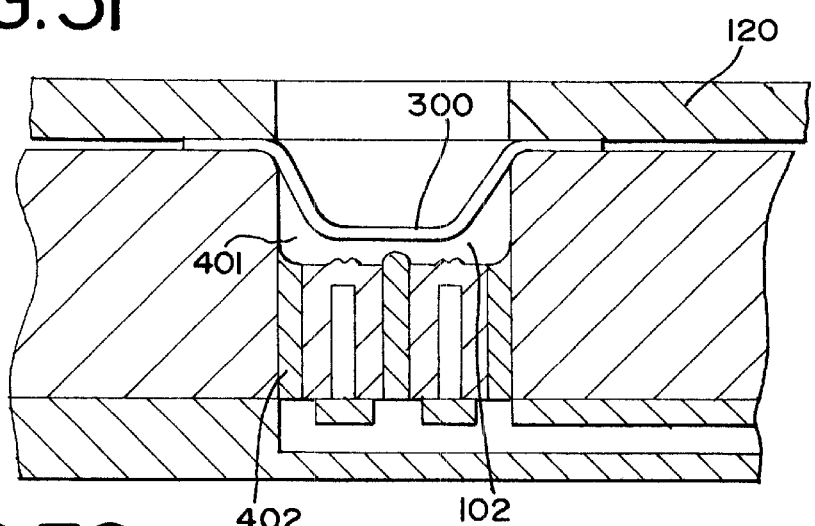
FIG. 31 is the same view of FIG. 30, but illustrates the partial drawdown of the fabric into the mold after the application of negative air pressure to the mold cavity.

FIG. 31 shows the application of the above-mentioned negative air pressure to the cavity 102. This causes a drawing of the fabric sheet 300 into the cavity 102. The use and placement of multiple porous inserts 402 ensures that the fabric 300 is initially drawn into the cavity 102.

Figure 32:
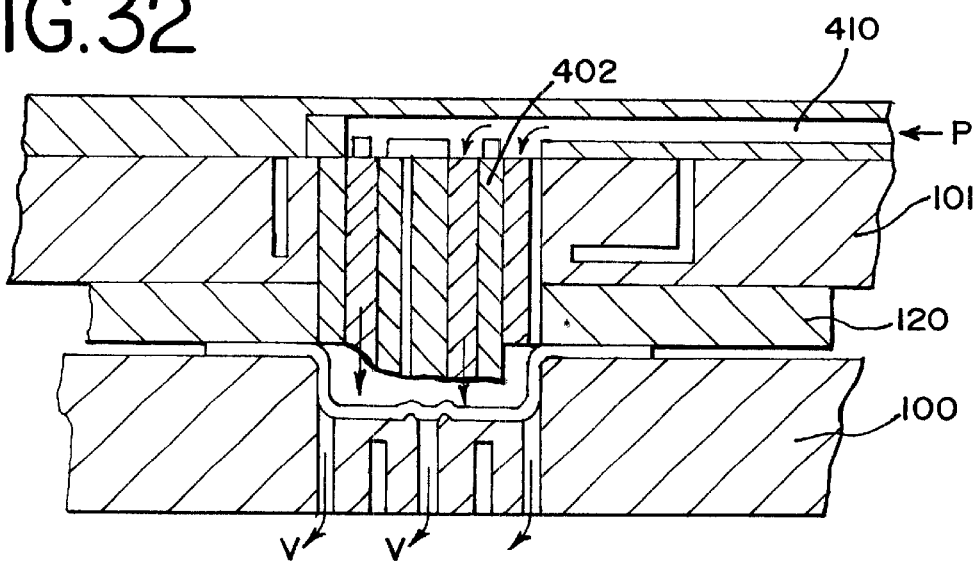
FIG. 32 is a schematic cross-sectional view of the two mold members brought together and illustrating the pneumatic balance on the fabric sheet; and, FIG. 33 is a schematic plan view of a female mold member with a recessed cavity portion illustrating one placement of the porous inserts.

FIG. 32 illustrates schematically the mating of the other, male mold member 101 to the female mold member 100 after the initial drawdown. The detailed portion 161 of the male mold member 101 also has one or more porous inserts 402 disposed therein and in communicating with the detailed portion 161 and an air passage 410 that is connected to a source of positive air pressure P. In this fashion, positive air pressure, as shown by the arrows of FIG. 32 is applied to the other side of the fabric 300 to assist it in its drawdown into the cavity 102. Thus, with the use of dual inserts 402 or both sides of the fabric 300, an even drawing is effected without wrinkling or tearing of the fabric. This may be considered as a pneumatic balance on the fabric. Once the fabric 300 is drawn completely into the cavity 102, the molding material may be injected as shown and mentioned above through a gate in the female mold member 100 (or the male mold member 101). During injection, the input of positive air pressure is ended and the passage 410 may be used to vent gas or air from the mold cavity 102.

While the preferred embodiment of the invention have been shown and described, it will be apparent to those skilled in the art that changes and modifications may be made therein without departing from the spirit of the invention, the scope of which is defined by the appended claims.

What is claimed is:

1. A process for forming a molded article having an injection-molded body portion with first and second opposing surfaces and a fabric applied to one of said first and second surfaces, the method comprising the steps of:

providing a mold assembly having first and second mold blocks, the first mold block having a cavity portion disposed thereon and the second mold block having a detail portion disposed thereon, said first and second mold blocks being interengageable with each other such that cavity and detail portions cooperatively define an interior cavity of said mold assembly;

providing a sheet of fabric for application to said molded article;

placing the fabric sheet between said first and second mold blocks in alignment with said cavity portion;

applying negative air pressure to said cavity portion and partially drawing said fabric into said cavity portion;

engaging said first and second mold blocks together to form said mold assembly interior cavity;

applying positive air pressure to said detail portion in order to assist said fabric sheet in being drawn into said cavity portion; and, injecting a molding material into said interior mold cavity to form the molded article, said fabric being bonded to said molded article along substantially all of said first surface of said molded article.

2. The method of claim 1, wherein said step of placing said fabric sheet includes the steps of providing a retention plate interposed between said first and second mold blocks and moving said retention plate into contact with said film sheet to hold said fabric sheet against said first mold block over said cavity portion thereof.

3. The method of claim 1, wherein said first mold block include at least one porous insert that defines at least a portion of said cavity portion, the porous insert having a porosity great enough to permit passage of gases through said porous insert, but low enough so as to preclude passage of molding material therethrough.

4. The method of claim 3, wherein said step of applying negative air pressure to said fabric sheet includes the step of applying negative air pressure to said first mold block, through said porous insert to thereby create a vacuum in said cavity portion and on one side of said fabric sheet to thereby at least partially draw said fabric sheet into said cavity portion.

5. The method of claim 3, wherein said second mold block includes at least one porous insert that defines a portion of said detail portion, the second mold porous insert having a porosity great enough to permit passage of gases through said second mold block porous insert, but low enough so as to preclude passage of molding material therethrough.

6. The method of claim 4, wherein said second mold block includes at least one porous insert that defines a portion of said detail portion, the second mold porous insert having a porosity great enough to permit passage of gases through said second mold block porous insert, but low enough so as to preclude passage of molding material therethrough.

7. The method of claim 6, wherein said step of positive air pressure to said fabric sheet includes the step of applying positive air pressure to second mold block porous insert to thereby create a positive air pressure in said cavity portion on an opposite side of said fabric sheet to thereby assist in the drawing of said fabric sheet into said cavity portion.

8. The method of claim 1, further including the step of ending the application of positive air pressure while injecting said molding material and subsequently venting said interior cavity of said mold assembly.

9. The method of claim 1, wherein said second mold block has at least one air passage formed therein and leading to said detail portion, the second mold block air passage communicating with a porous insert that forms part of said detail portion.

10. The method of claim 9, wherein said second mold block has a plurality of porous inserts that form distinct parts of said detail portion and a plurality of air passages communicating therewith.

11. The method of claim 3, wherein said first mold block has a plurality of porous inserts, said porous inserts being disposed in a preselected pattern in said cavity portion to produce a substantially even draw-down of said fabric sheet; and said second mold block has a plurality of porous inserts, said second mold block inserts being disposed in a preselected pattern on said detail portion to produce a substantially even application of positive air pressure on said sheet.

12. A process for the forming of molded articles in which the articles have a molded body portion and a fabric applied to an exterior surface of said molded article, the method comprising the steps of:

providing a mold assembly having female and male mold blocks, the female mold block having a cavity portion disposed therein defining part of a shape of an article to be molded, and the male mold block having a detail portion disposed thereon defining the remaining part of said molded article, said female and male mold blocks being interengageable with each other such that cavity and detail portions cooperatively define an interior cavity of said mold assembly, said female mold block including at least one first porous insert that forms at least a portion of said cavity portion, said male mold block including at least one second porous insert that forms at least a portion of said detail portion, the first and second porous inserts having a porosity great enough to permit passage of gases through said porous insert, but low enough so as to preclude passage of molding material through said porous insert;

providing a sheet of fabric for application to said molded article;

placing the fabric sheet upon said first mold block in alignment with said cavity portion, such that a first side of said fabric sheet faces said cavity portions and a second side of said fabric sheet faces said detail portions;

drawing at least a portion of said fabric sheet into said cavity portion by applying negative air pressure to said cavity portion through said first porous insert, thereby creating at least a partial vacuum in said cavity portion on said first side of said fabric sheet sufficient to draw a portion of said fabric sheet into said cavity portion;

engaging said first and second mold blocks together to form said mold assembly interior cavity;

applying positive air pressure to said detail portion through said second porous insert, thereby creating a positive air pressure force on said second side of said fabric sheet sufficient to assist in the drawing of said fabric sheet into said cavity portion; and, injecting a molding material into said interior mold cavity to form the molded article, said fabric sheet being bonded to said molded article along substantially all of said exterior surface of said molded article.

* * * * *